US011093767B1

(12) United States Patent
Argenti et al.

(10) Patent No.: US 11,093,767 B1
(45) Date of Patent: Aug. 17, 2021

(54) SELECTING INTERACTIVE OPTIONS BASED ON DYNAMICALLY DETERMINED SPARE ATTENTION CAPACITY

(71) Applicant: Amazon Technologies, Inc., Seattle, WA (US)

(72) Inventors: Marco Argenti, Mercer Island, WA (US); Nanyan Nicholls, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/364,088

(22) Filed: Mar. 25, 2019

(51) Int. Cl.
| | |
|---|---|
| *G06K 9/00* | (2006.01) |
| *B60W 40/09* | (2012.01) |
| *B60W 50/14* | (2020.01) |
| *B60W 40/06* | (2012.01) |
| *B60K 35/00* | (2006.01) |

(52) U.S. Cl.
CPC .......... *G06K 9/00845* (2013.01); *B60K 35/00* (2013.01); *B60W 40/06* (2013.01); *B60W 40/09* (2013.01); *B60W 50/14* (2013.01); *B60K 2370/1868* (2019.05); *B60K 2370/736* (2019.05); *B60W 2050/146* (2013.01)

(58) Field of Classification Search
CPC .. G06K 9/00845; B60W 40/09; B60W 40/06; B60W 50/14; B60K 35/00; B06K 2370/736; B06K 2370/1868; B06W 2050/146
See application file for complete search history.

(56) References Cited

U.S. PATENT DOCUMENTS

| | | | | |
|---|---|---|---|---|
| 6,356,812 B1* | 3/2002 | Cragun | ................. | B60K 35/00 701/1 |
| 6,909,947 B2* | 6/2005 | Douros | ............... | G07C 5/0808 701/34.4 |
| 8,719,280 B1* | 5/2014 | Paglia | .................... | G06F 16/24 707/748 |
| 8,860,564 B2* | 10/2014 | Rubin | ................ | H04W 72/005 340/436 |
| 9,141,583 B2* | 9/2015 | Prakah-Asante | ...... | B60K 28/02 |
| 9,283,847 B2* | 3/2016 | Riley, Sr. | ........... | A61B 5/02055 |
| 9,376,018 B2* | 6/2016 | Aryal | ..................... | B60K 35/00 |
| 9,381,813 B2* | 7/2016 | Hampiholi | ............ | B60K 35/00 |
| 9,466,161 B2* | 10/2016 | Ricci | ..................... | G06F 16/183 |
| 9,654,437 B2* | 5/2017 | Shen | ....................... | H04L 51/26 |
| 9,663,118 B1* | 5/2017 | Palmer | ................ | G05D 1/0088 |
| 9,680,784 B2* | 6/2017 | Basson | .................. | H04L 51/18 |

(Continued)

OTHER PUBLICATIONS

Unknown, "Galaxy S7—Do Not Disturb )SM-G930W8)" dated Mar. 25, 2019, pp. 1-18.

(Continued)

*Primary Examiner* — Jerry B Dennison
(74) *Attorney, Agent, or Firm* — Robert C. Kowert; Kowert, Hood, Munyon, Rankin & Goetzel, P.C.

(57) ABSTRACT

A dynamic attention capacity service and/or a filtering application determine a current spare attention capacity of an occupant of a vehicle to process and/or respond to interactive options. The dynamic attention capacity service and/or the filtering application selectively adjust interactive options to be presented to the occupant of the vehicle based on the current spare attention capacity of the occupant of the vehicle.

19 Claims, 17 Drawing Sheets

(56) References Cited

U.S. PATENT DOCUMENTS

| | | | | |
|---|---|---|---|---|
| 9,946,782 | B2* | 4/2018 | Davis | G06Q 30/02 |
| 10,168,683 | B2* | 1/2019 | Brew | G10L 15/1807 |
| 10,228,260 | B2* | 3/2019 | Swaminathan | G01C 21/26 |
| 10,235,122 | B1* | 3/2019 | Goel | G02B 27/0093 |
| 10,275,959 | B2* | 4/2019 | Ricci | A61B 5/4809 |
| 10,333,886 | B2* | 6/2019 | Davis | G06Q 10/107 |
| 10,366,219 | B2* | 7/2019 | Kurian | G06F 21/32 |
| 10,410,250 | B2* | 9/2019 | Singhal | G08G 1/166 |
| 10,423,292 | B2* | 9/2019 | Chan | G06F 3/0481 |
| 10,431,215 | B2* | 10/2019 | Cohen | G10L 15/22 |
| 10,693,823 | B2* | 6/2020 | Bostick | H04L 51/063 |
| 10,893,010 | B1* | 1/2021 | Argenti | H04L 51/12 |
| 2002/0087649 | A1* | 7/2002 | Horvitz | G06Q 10/107 |
| | | | | 709/207 |
| 2004/0030753 | A1* | 2/2004 | Horvitz | G05B 19/404 |
| | | | | 709/206 |
| 2004/0254998 | A1* | 12/2004 | Horvitz | G06Q 10/107 |
| | | | | 709/206 |
| 2006/0036695 | A1* | 2/2006 | Rolnik | H04L 51/24 |
| | | | | 709/206 |
| 2011/0006892 | A1* | 1/2011 | Karpinsky | B60K 35/00 |
| | | | | 340/461 |
| 2012/0056901 | A1* | 3/2012 | Sankarasubramaniam | |
| | | | | G06F 3/005 |
| | | | | 345/660 |
| 2012/0290511 | A1* | 11/2012 | Frank | G06F 3/013 |
| | | | | 706/12 |
| 2013/0038437 | A1* | 2/2013 | Talati | B60K 35/00 |
| | | | | 340/438 |
| 2013/0205026 | A1* | 8/2013 | Ricci | H04L 47/70 |
| | | | | 709/225 |
| 2013/0275899 | A1* | 10/2013 | Schubert | G06F 3/0481 |
| | | | | 715/765 |
| 2014/0068406 | A1* | 3/2014 | Kornacki | G06F 16/48 |
| | | | | 715/230 |
| 2014/0142798 | A1* | 5/2014 | Guarnizo Martinez | |
| | | | | B60W 10/18 |
| | | | | 701/23 |
| 2014/0195120 | A1* | 7/2014 | McClain | G08G 1/16 |
| | | | | 701/41 |
| 2014/0229060 | A1* | 8/2014 | MacNeille | G06Q 30/0255 |
| | | | | 701/36 |
| 2014/0309849 | A1* | 10/2014 | Ricci | H04W 4/21 |
| | | | | 701/33.4 |
| 2014/0323111 | A1* | 10/2014 | Ning | H04M 1/72577 |
| | | | | 455/418 |
| 2015/0266377 | A1* | 9/2015 | Hampiholi | B60K 35/00 |
| | | | | 455/466 |
| 2015/0281162 | A1* | 10/2015 | Shen | H04L 51/26 |
| | | | | 709/206 |
| 2016/0039426 | A1* | 2/2016 | Ricci | G06K 9/00288 |
| | | | | 701/1 |
| 2016/0112517 | A1* | 4/2016 | Wilson | B60W 50/085 |
| | | | | 717/178 |
| 2016/0147563 | A1* | 5/2016 | Prakah-Asante | G06F 9/546 |
| | | | | 719/314 |
| 2016/0189444 | A1* | 6/2016 | Madhok | G07C 5/02 |
| | | | | 701/36 |
| 2016/0196745 | A1* | 7/2016 | Ricci | G06F 13/14 |
| | | | | 340/905 |
| 2017/0021837 | A1* | 1/2017 | Ebina | B60W 50/085 |
| 2017/0048179 | A1* | 2/2017 | Basson | H04L 51/18 |
| 2017/0097243 | A1* | 4/2017 | Ricci | G06F 3/017 |
| 2017/0132016 | A1* | 5/2017 | Zilberman | G06F 9/451 |
| 2017/0134662 | A1* | 5/2017 | Kosaka | G06T 11/60 |
| 2017/0142211 | A1* | 5/2017 | Shaw | H04L 67/24 |
| 2017/0177318 | A1* | 6/2017 | Mark | G06F 16/248 |
| 2018/0018889 | A1* | 1/2018 | Koutrika | G06Q 30/02 |
| 2018/0111552 | A1* | 4/2018 | Neiswander | B60W 40/08 |
| 2018/0215395 | A1* | 8/2018 | Keany | B60W 50/14 |
| 2018/0229654 | A1* | 8/2018 | Unver | H04W 4/48 |
| 2018/0272965 | A1* | 9/2018 | Chen | G06F 3/04847 |
| 2019/0187870 | A1* | 6/2019 | Bostick | G06F 3/013 |
| 2019/0213429 | A1* | 7/2019 | Sicconi | G06K 9/00845 |
| 2019/0236386 | A1* | 8/2019 | Yu | A61B 3/113 |
| 2020/0004877 | A1* | 1/2020 | Ghafourifar | G06F 16/35 |
| 2020/0007482 | A1* | 1/2020 | Bastide | H04L 51/063 |
| 2020/0057487 | A1* | 2/2020 | Sicconi | G06T 7/11 |
| 2020/0092238 | A1* | 3/2020 | Bostick | H04L 51/18 |
| 2020/0099547 | A1* | 3/2020 | Gaffar | H04L 12/40019 |
| 2020/0133745 | A1* | 4/2020 | Dugan | G06F 9/542 |
| 2020/0282979 | A1* | 9/2020 | Kim | B60W 40/09 |
| 2020/0326669 | A1* | 10/2020 | Penna Santana | G05B 13/0265 |

OTHER PUBLICATIONS

Unknown, "Limit Interruptions with Do Not Disturb on Android", dated Mar. 25, 2019, pp. 1-3.
U.S. Appl. No. 15/466,744, filed Mar. 22, 2017, Timothy Mattison.
U.S. Appl. No. 15/635,144, filed Jun. 27, 2017, Aran Khanna.
U.S. Appl. No. 15/635,147, filed Jun. 27, 2017, Aran Khanna.
U.S. Appl. No. 15/635,148, filed Jun. 27, 2017, Aran Khanna.
U.S. Appl. No. 15/660,859, filed Jul. 26, 2017, Sunsil Mallya Kasaragod.
U.S. Appl. No. 15/716,033, filed Sep. 26, 2017, Feng Wang.
U.S. Appl. No. 15/801,264, filed Nov. 1, 2017, Calvin Yue-Ren Kuo.
U.S. Appl. No. 16/364,086, filed Mar. 25, 2019, Marco Argenti.

* cited by examiner

SELECTING INTERACTIVE OPTIONS BASED ON DYNAMICALLY DETERMINED SPARE ATTENTION CAPACITY

BACKGROUND

Communication systems, such as phones, email, social media, news updates, etc. offer some basic filtering capabilities, but are typically unaware of the capacity of an intended recipient to receive information given current conditions in which the intended recipient is operating. For example, some communication systems offer "do not disturb" features, which may provide binary choices, such as "available to receive incoming communications" or "not available to receive incoming communications." Also, such "do not disturb" features may be applied to communications without taking into account variations in the ability of the intended recipient to receive a given message based on dynamically changing circumstances. For example, a "do not disturb while driving" feature may prevent all messages from being received by an intended recipient while the intended recipient is driving, regardless of whether or not the current driving conditions the intended recipient is facing require all of the intended recipient's attention.

Also, some interactive systems, such as vehicle navigations systems, hands-free calling systems, etc. may provide interactive options to an occupant of a vehicle without an awareness of the capacity of the intended recipient to process the interactive options and respond to the interactive options. Also, some interactive systems may apply a binary choice, wherein interactive options can be selected when the vehicle is not in a "drive" mode and cannot be selected when the vehicle is in the "drive" mode. For example, some navigation systems may not allow a new destination address to be entered while a vehicle is in drive. Such interactive systems may not take into account variations in the ability of an intended recipient to process and/or respond to an interaction option presented to the intended recipient.

Additionally, vehicle systems are rapidly advancing such that many vehicles offer semi-autonomous driving features, autonomous driving features, or other advanced driver-assistance system features. Due to these advances and future advances, an occupant of a vehicle may be required to provide smaller amounts of the occupant's attention to operation of the vehicle. However, from time to time, circumstances may require a greater portion of the driver's attention. Communication systems and/or interactive systems that offer binary "do not disturb" features may unnecessarily restrict information flow to an occupant of a vehicle, when engaged in a "do not disturb" mode, even if the occupant has the attention capacity to receive the information, or such communication systems and/or interactive systems, when not engaged in the "do not disturb" mode, may inundate the occupant with more information than the occupant can safely process given current demands on the occupant's attention, for example in regard to operating the vehicle.

Figure 1A:
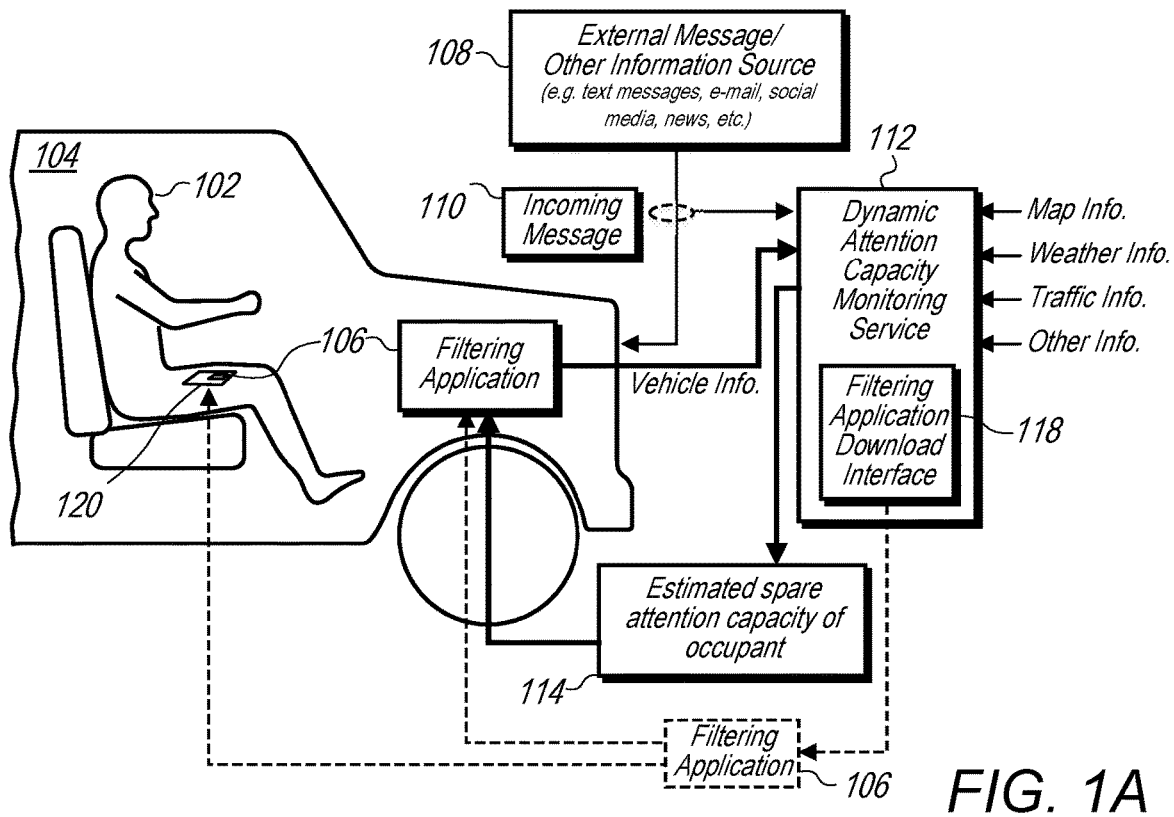
FIG. 1A illustrates a dynamic attention capacity monitoring system interacting with local devices in a vehicle to dynamically filter incoming messages or other information directed to an occupant of the vehicle, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for dynamically determining an estimated spare attention capacity of an occupant of a vehicle to receive an incoming message or other information, and filtering the message or other information based on the determined estimated spare attention capacity. In some embodiments, filtering the message or other information may include blocking the message or other information from being presented to the occupant, delaying presentment of the message or other information to the occupant, or reducing an amount of information presented to the occupant of the vehicle regarding the message or other information. In some embodiments, other forms of filtering may be applied.

In some embodiments, a system includes one or more computing devices configured to receive information related to operation of a vehicle or conditions within which the vehicle is operating and monitor for one or more messages directed to an occupant of the vehicle. The one or more computing devices are further configured to determine, based on the received information, an estimated amount of spare attention capacity of the occupant of the vehicle to receive the one or more messages directed to the occupant of the vehicle, wherein the estimated amount of spare attention capacity represents a difference between an overall estimated attention capacity of the occupant of the vehicle and an estimated amount of attention required of the occupant of the vehicle for operation of the vehicle given current conditions within which the vehicle is operating. Also, the one or more computing devices are configured to provide the determined estimated amount of spare attention capacity to an application for use in dynamic filtering of the one or more messages, wherein the application filters the one or more messages such that an amount of information from the one or more messages presented to the occupant of the vehicle does not exceed a current amount of spare attention capacity of the occupant of the vehicle to receive the one or more dynamically filtered messages.

In some embodiments, the application for use in dynamic filtering of the one or more messages or other information may be implemented on a separate device, such as a device local to the vehicle within which the occupant in located or, may be implemented on the one or more computing devices that determine the estimated spare attention capacity. For example, in some embodiments, the one or more computing devices may be part of a provider network that offers a dynamic attention capacity monitoring service, wherein a filtering application is implemented on a local device in a vehicle, such as an operating system of a vehicle or on operating system of a mobile device of an occupant of the vehicle. The local device may perform message filtering based on estimated amounts of spare attention capacity of the occupant of the vehicle provided to the local device from a cloud-based dynamic attention capacity monitoring service. Also, in some embodiments, the filtering application may be implemented on the one or more computing devices that dynamically determine amounts of spare attention capacity of the occupant of the vehicle, wherein messages directed to the occupant of the vehicle are filtered by the filtering application. The filtering application and the one or more computing devices that dynamically determine amounts of spare attention capacity of the occupant of the vehicle may be part of a cloud-based service. In such embodiments, the cloud-based service may filter messages directed to an occupant of the vehicle based on the estimated amounts of spare attention capacity of the occupant of the vehicle, and provide instructions to a local device for presenting the filtered messages or other information.

In some embodiments, a method includes receiving information related to operation of a vehicle or conditions within which the vehicle is operating and determining, based on the received information, an amount of spare attention capacity of an occupant of the vehicle to receive one or more messages or other information from a source external to the vehicle. The method further includes providing the determined amount of spare attention capacity of the occupant to an application for use in dynamically filtering the one or more messages or the other information from the external source such that an amount of information from the one or more messages or the other information communicated to the occupant of the vehicle does not exceed a current amount of spare attention capacity of the occupant of the vehicle to receive the one or more messages or the other information.

In some embodiments, one or more non-transitory, computer-readable storage media store instructions that, when executed on or across one or more processors, cause the one or more processors to receive information related to operation of a vehicle or conditions within which the vehicle is operating and determine, based on the received information, an amount of spare attention capacity of an occupant of the vehicle to receive one or more messages or other information from a source external to the vehicle. The instructions, when executed on or across the one or more processors further cause the one or more processors to provide the determined amount of spare attention capacity of the occupant for use in dynamically filtering the one or more messages or other information from the external source such that an amount of information from the one or more messages or other information communicated to the occupant of the vehicle does not exceed a current amount of spare attention capacity of the occupant of the vehicle to receive the one or more messages or other information.

In some embodiments, a system includes one or more computing devices configured to receive information related to operation of a vehicle or conditions within which the vehicle is operating and determine, based on the received information, an estimated amount of spare attention capacity of an occupant of the vehicle, wherein the estimated amount of spare attention capacity represents a difference between an overall estimated attention capacity of the occupant of the vehicle and an estimated amount of attention required of the occupant of the vehicle for operation of the vehicle given current conditions within which the vehicle is operating. The one or more computing devices are also configured to provide the determined estimated amount of spare attention capacity to an application for use in dynamically determining interactive options to be presented to the occupant of the vehicle, wherein the application is configured to dynamically adjust the interactive options presented to the occupant of the vehicle based on a current estimated amount of spare attention capacity of the occupant of the vehicle to process or respond to the interactive options.

In some embodiments, a method includes receiving information related to operation of a vehicle or conditions within which the vehicle is operating and determining, based on the received information, an amount of spare attention capacity of an occupant of the vehicle. The meth further includes providing the determined amount of spare attention capacity of the occupant of the vehicle to an application for use in dynamically determining interactive options to be presented to the occupant of the vehicle, wherein the application is configured to dynamically adjust the interactive options presented to the occupant of the vehicle based on a current determined amount of spare attention capacity of the occupant of the vehicle such that the interactive options presented to the occupant of the vehicle do not exceed the current determined amount of spare attention capacity of the occupant of the vehicle to process or respond to the interactive options.

In some embodiments, one or more computer readable media store program instructions that when executed on, or across, one or more processors cause the one or more processors to implement an interface configured to provide an application for download to a local device, local to a vehicle or local to an occupant of the vehicle, wherein the application is configured to receive, from a dynamic attention capacity monitoring service, an estimated amount of spare attention capacity of the occupant of the vehicle and dynamically determine interactive options to present to the occupant of the vehicle based on the estimated amount of spare attention capacity of the occupant of the vehicle to process or respond to the interactive options, wherein the interactive options are dynamically determined such that the interactive options presented to the occupant of the vehicle do not exceed a current amount of spare attention capacity of the occupant of the vehicle to process or respond to the interactive options.

Some mobile devices offer a "do not disturb while driving" feature. However, such features may work in a binary manner. For example, all messages may be blocked from being received while the device is in driving mode, or no messages may be blocked from being received when the device is not in driving mode. Moreover, all driving may be treated the same. For example, driving at high speed on a curvy road in the rain may be treated the same as driving on a straight road on a sunny day at a low speed. In both scenarios, the system may block messages from being received by an occupant of the vehicle while the mobile device is in the driving mode. Additionally, such "do not disturb while driving" features are often implemented on a local device, such as portable phone, that lacks capacity to store sufficient data and lacks sufficient computing capacity to perform more nuanced filtering. Also, some vehicle systems, such as navigation systems, may include interactive features that are offered in a binary manner, wherein the interactive features are disabled when the vehicle is in motion (at any speed) and are enabled when the vehicle is at a complete stop or not in a drive mode.

In contrast, in some embodiments, a dynamic attention capacity monitoring service may utilize the computing capacity and the data storage capacity of a cloud-based service to dynamically determine an estimated spare attention capacity of an occupant of a vehicle based on received information related to operation of a vehicle or conditions within which the vehicle is operating. The dynamically determined estimated spare attention capacity of the occupant may be updated in real-time based on current conditions in which the vehicle is operating and based on a relationship between the occupant of the vehicle and the vehicle. For example, the relationship may be whether or not an auto-pilot feature of the vehicle is engaged, or whether the vehicle is being driven by the occupant of the vehicle with minimal or no support from an advanced driver assistance system or driving automation system. In some embodiments, a filtering application may then filter messages directed to the occupant of the vehicle based on the dynamically determined spare attention capacity of the occupant of the vehicle. For example, the occupant may not be presented with any messages or may only be presented with minimal information about high priority messages while driving at a high speed on a curvy road, whereas the occupant may be presented with a wider variety of messages or information from messages while driving on a straight road at a low speed. In this way, the presentment of messages to an occupant of a vehicle may be adjusted in real-time to match the spare attention capacity of the occupant of the vehicle with an amount of information from the messages or other information that is to be presented to the occupant of the vehicle.

In some embodiments, additionally, or alternatively, a determined spare attention capacity of an occupant of a vehicle may be used to adjust how interactive options are presented to the occupant of the vehicle. For example, when the occupant has a lower amount of spare attention capacity, fewer interactive options, simpler interactive options, interactive options that require less response effort, etc. may be presented to the occupant of the vehicle. And, when the occupant has a higher amount of spare attention capacity, more interactive options, more detailed interactive options, interactive options that allow for more customization on the part of the occupant, etc. may be presented to the occupant of the vehicle.

FIG. 1A illustrates a dynamic attention capacity monitoring system interacting with local devices in a vehicle to dynamically filter incoming messages or other information directed to an occupant of the vehicle, according to some embodiments.

In some embodiments, a dynamic attention capacity monitoring service, such as dynamic attention capacity monitoring service 112, works in conjunction with one or more filtering applications downloaded to a local device in a vehicle, such as filtering applications 106 downloaded from filtering application download interface 118 of dynamic attention capacity monitoring service 112. The dynamic attention capacity monitoring service working in conjunction with the filtering applications, such as filtering applications 106, may filter messages or other information directed to an occupant of a vehicle based on a dynamically determined amount of spare attention capacity of the occupant of the vehicle to accept information, such as incoming messages.

In some embodiments, a filtering application, such as filtering application 106, may operate on a mobile device such as a portable phone, tablet, laptop etc. In some embodiments, the mobile device may be connected to a hands free feature of a vehicle, such as vehicle 104, such that messages from the mobile device are presented to an occupant, such as occupant 102, via one or more user interfaces of the vehicle. For example, a mobile device may be physically or wirelessly connected to a vehicle user interface system such that messages are presented audibly over speakers of the vehicle or are presented visually via one or more displays or display features of the vehicle, such as a heads-up display. Also, in some embodiments, a filtering application, such as filtering application 106, may be implemented in an operating system of the vehicle such as in software that interacts with a user interface of the vehicle that interacts with speakers, displays or display features of the vehicle.

In some embodiments, a dynamic attention capacity monitoring service, such as dynamic attention capacity monitoring service 112, receives information from multiple sources and uses this information to determine an estimated amount of spare attention capacity of an occupant of a vehicle, such as occupant 102, wherein the amount of spare attention capacity represents a capacity of the occupant (e.g. occupant 102) to receive messages, such as incoming message 110, or other information without negatively affecting the occupant's safety or ability to operate the vehicle.

For example, in some embodiments, a dynamic attention capacity monitoring service, such as dynamic attention capacity monitoring service 112, may receive information from a vehicle, such as vehicle 104, via a communication interface of the filtering application 106 and a network connection between the filtering application 106 and the dynamic attention capacity monitoring service 112. For example, in some embodiments, a filtering application, such as filtering application 106, may enable two way communication, via a network, between a local device, such as vehicle 104 or mobile device 120, and a remote service, such as dynamic attention capacity service 112. In the two way communication, the filtering application may provide vehicle information to a remote dynamic attention capacity monitoring service and the remote dynamic attention capacity monitoring service may provide estimated spare attention capacity information regarding the occupant back to the filtering application, wherein the filtering application uses this determined estimated spare attention capacity information to determine whether and how to filter incoming messages or other information directed to the occupant of the vehicle.

In some embodiments, the vehicle information may include information such as a current speed of the vehicle, information from cameras of the vehicle, information from cameras of other mobile devices, such as mobile device 120, information about vehicle systems that are currently engaged (e.g. windshield wipers, radio, lane-assist, etc.), information indicating whether an advanced driving assistance system, semi-autonomous driving system, or an autonomous driving system of the vehicle is currently engaged, etc.

In some embodiments, a dynamic attention capacity monitoring system, such as dynamic attention capacity monitoring system 112, may receive information about the conditions in which the vehicle is travelling from various other sources, such as from a map service, a weather service, a traffic reporting service, or other services that provide information relevant to the conditions in which the vehicle is operating.

In some embodiments, a dynamic attention capacity monitoring service, such as dynamic attention capacity monitoring service 112, may determine an overall attention capacity of an occupant of a vehicle, such as occupant 102, based on historical driving records of the occupant or based on other stored information relating to the occupant. In some embodiments, a dynamic attention capacity monitoring service, such as dynamic attention capacity monitoring service 112, may utilize a default overall spare attention capacity for the occupant, such as occupant 102, or may utilize one or more pre-defined overall attention capacity profiles based on known information about the occupant, such as occupant 102. The dynamic attention capacity monitoring service may then determine an amount of attention required to safely operate the vehicle based on the collected vehicle information, map information, weather information, traffic information, or other information. A dynamic attention capacity monitoring service, such as dynamic attention capacity monitoring service 112, may then subtract the required amount of attention from the overall attention capacity of the occupant to determine the spare attention capacity of the occupant. In some embodiments, a dynamic attention capacity monitoring service, such as dynamic attention capacity monitoring service 112, may dynamically update the determined estimated spare attention capacity of an occupant, such as occupant 102, based on updated information received by the dynamic attention capacity monitoring service, such as updated vehicle information, updated map information, updated weather information, updated traffic information, etc. The dynamic attention capacity monitoring service may then provide the updated estimated spare attention capacity information to the filtering application to update how the filtering application filters incoming messages or other information.

For example, filtering application 106 may receive incoming message 110 from external message or other information source 108 and determine whether or not to present the incoming message 110 to occupant 102, hold the incoming message 110 to present to occupant 102 at a later time, minimize the information in the incoming message 110 for presentment to occupant 102, or otherwise filter and present information related to incoming message 110 to occupant 102 based on "estimated spare attention capacity of the occupant 114" received from dynamic attention capacity monitoring service 112.

In some embodiments, a dynamic attention capacity monitoring service, such as dynamic attention capacity monitoring service 112, may further monitor for incoming messages and determine a priority score for the incoming messages based on weighted prioritization factors. In some embodiments, different messages may be filtered in different ways for a given spare attention capacity level of an occupant based on the messages having different priorities. For example, highly important messages from family members of the occupant may be presented, whereas less important messages from distant acquaintances of the occupant may be blocked, as an example. In some embodiments, an occupant may adjust prioritization settings for messages, or a dynamic attention capacity monitoring service may learn message prioritization based on historical information or other information about the occupant provided to the dynamic attention capacity monitoring service.

In some embodiments, an incoming message, such as incoming message 110, may be a text message, an e-mail, a voice call, a voice message, a video message, a social media message, a news update, or other type of incoming message or other information. As discussed in more detail in regard to FIGS. 12-14, in some embodiments, a filtering application, such as filtering application 106, may dynamically determine interactive options to be presented to an occupant of a vehicle, such as occupant 102, based on an estimated amount of spare attention capacity of the occupant, such as "estimated spare attention capacity of the occupant 114." In some embodiments, dynamically determined interactive options may be used to present a message or other information that has also been filtered by a filtering application, such as filtering application 106.

Figure 1B:
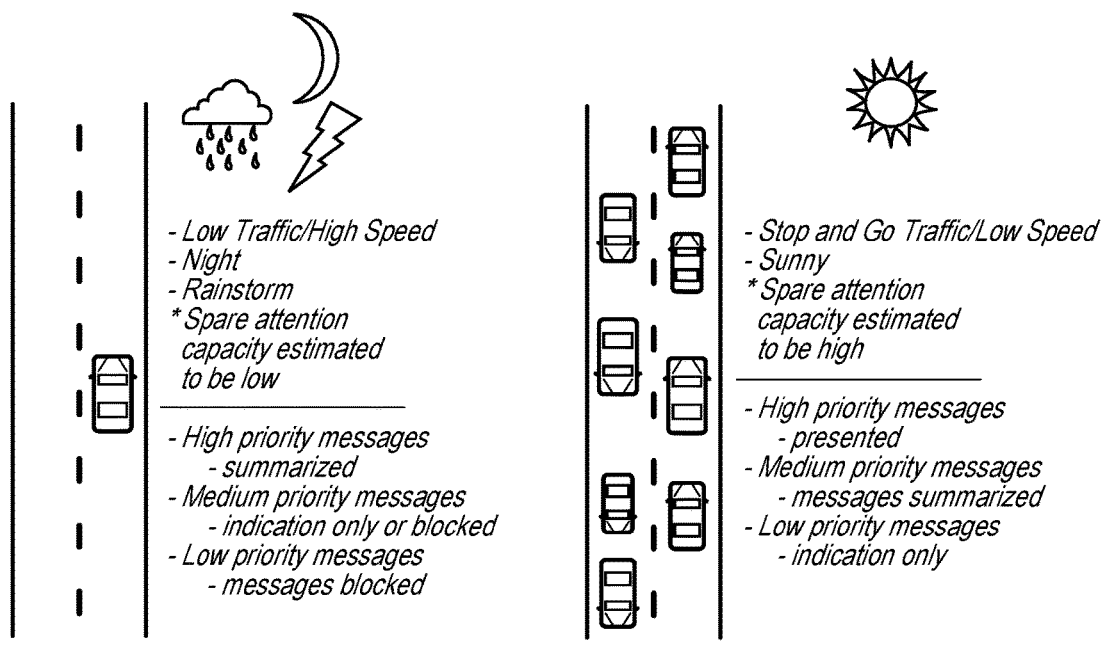
FIG. 1B illustrates example conditions within which a vehicle may be operating and different message filtering responses for the example conditions, according to some embodiments.

FIG. 1B illustrates example conditions within which a vehicle may be operating and different message filtering responses for the example conditions, according to some embodiments.

For example, in a low traffic/high speed environment at night in a rainstorm all or virtually all of an occupant of a vehicle's attention may be required to safely operate the vehicle. Therefore the spare attention capacity of the occupant of the vehicle may be estimated by a dynamic attention capacity monitoring service, such as dynamic attention capacity service 112, to be low. The dynamic attention capacity monitoring service may receive information from a weather service indicating that it is raining at a location of the vehicle and may receive traffic information from a traffic service indicating traffic conditions on a route the vehicle is travelling, wherein the traffic conditions indicate low traffic and high speeds. In some embodiments, the dynamic attention capacity monitoring service may receive GPS information from the filtering application downloaded to the vehicle or a mobile device of an occupant of the vehicle and use information from the GPS device to obtain traffic information from a traffic service or weather information from a weather service.

In some embodiments, a dynamic attention capacity monitoring service, such as dynamic attention capacity monitoring service 112, may further determine prioritization weighting factors for determining respective priorities of incoming messages. In some embodiments, the dynamic attention capacity monitoring service may utilize the weighting factors to determine priority scores for incoming messages or other information, wherein the dynamic attention capacity monitoring service determines the priority scores using a remote cloud-based service that implements the dynamic attention capacity monitoring service. The dynamic attention capacity monitoring service may provide the priority scores to a local filtering application, or in some embodiments, the dynamic attention capacity monitoring service may provide prioritization weighting factors to the local filtering application, such as filtering application 106, and the local filtering application may determine priority scores for incoming messages.

In some embodiments, the priority scores may include or may be used to compute ranking information for incoming messages. For example, in some embodiments, incoming messages may be included in a queue of messages to be presented to an occupant of a vehicle based on respective rankings and not necessarily in an order in which the messages were received. In some embodiments, a dynamic attention capacity monitoring service and/or a filtering application may minimize an amount of information associated with a given incoming message that is presented to an occupant of a vehicle. For example, only the presence of a new message may be indicated, the sender of the message may be presented (without more), the subject of the message may be presented (without more), a summary of the message may be presented, the whole message may be presented, or some combination thereof. In some embodiments, a filtering application may determine how much information from a message to present to an occupant, when to present a message to an occupant, whether to block a message etc., based on both the current spare attention capacity of the occupant of the vehicle and the priority score of the incoming message (or other information).

For example, as shown in FIG. 1B, when a spare attention capacity of an occupant of a vehicle is estimated to be low, high priority messages may be summarized, medium priority messages may simply be indicated, or may be blocked all together, and low priority messages may be blocked. As another example, when a spare attention capacity of an occupant of a vehicle is estimated to be high, high priority messages may be presented (in full or in a more complete version than the summary provided when spare attention capacity is low), similarly medium priority messages may be summarized, and the presence of low priority messages may be simply indicated without actually presenting information included in the low priority messages.

Note that these are given as examples, and in some embodiments other priority/summarization preference may be selected. Also, in some embodiments, a user of a dynamic attention capacity monitoring service, such as occupant 102 of vehicle 104, may customize message priority configurations and responses for various levels of spare attention capacity.

Figure 2A:
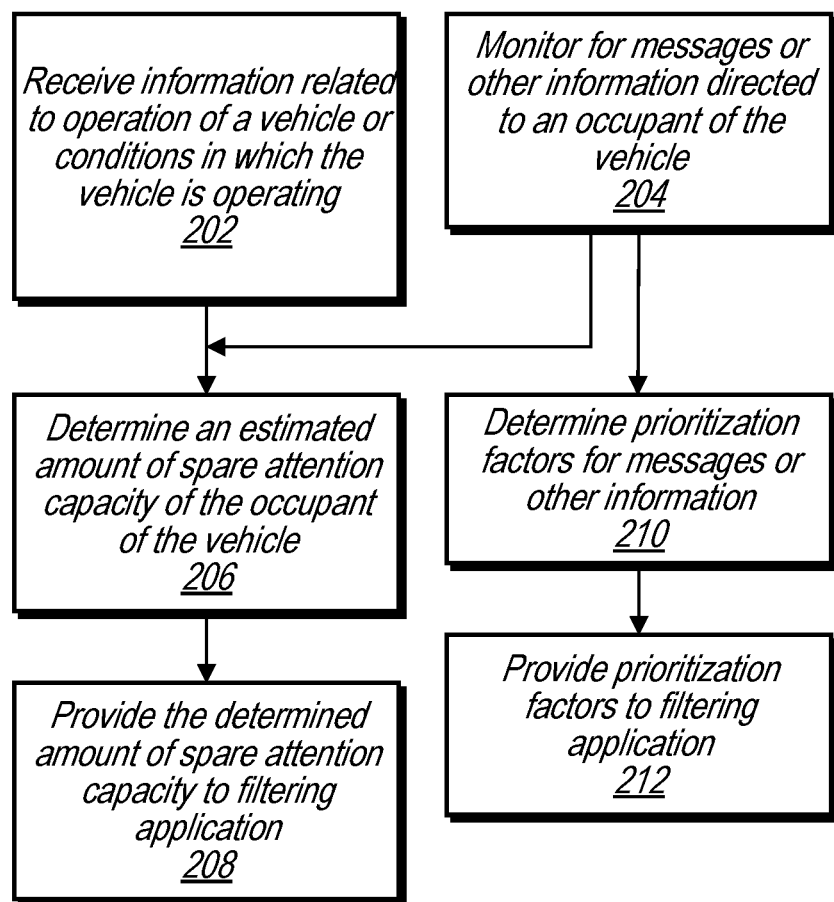
FIG. 2A illustrates a flow chart for determining an amount of spare attention capacity of an occupant of a vehicle to receive a message and determining prioritization factors for prioritizing incoming messages directed to the occupant, according to some embodiments.

FIG. 2A illustrates a flow chart for determining an amount of spare attention capacity of an occupant of a vehicle to receive a message and determining prioritization factors for prioritizing incoming messages directed to the occupant, according to some embodiments.

At 202, one or more computing devices implementing a dynamic attention capacity monitoring service receive information related to operation of a vehicle or conditions in which the vehicle is operating. In some embodiments, a service interface of a dynamic attention capacity monitoring service may include one or more application programmatic interfaces (APIs) or other interfaces that enable the dynamic attention capacity monitoring service to receive information from a filtering application downloaded onto a local device, local to the vehicle. The filtering application may collect information about a vehicle from one or more vehicle systems, such as a GPS system, speedometer, etc. The filtering application may send the vehicle information to a dynamic attention capacity monitoring service. Additionally, one or more other devices local to a vehicle, such as a mobile device (e.g. phone, tablet, etc.) comprising an inertial measurement unit (IMU) may further generate information about operation of the vehicle, such as speed, direction, etc. and a filtering application downloaded to the local device may send the information to a dynamic attention capacity monitoring service. In some embodiments, information from a plurality of local devices, local to the vehicle, may be collected by a local hub device, such as an on-board computer of the vehicle upon which a filtering application has been downloaded. The local hub device may then provide the collected information to a dynamic attention capacity monitoring service, such as dynamic attention capacity monitoring service 112.

At 204, the one or more computing devices implementing the dynamic attention capacity monitoring service, may receive information related to messages directed to an occupant of a vehicle, such as occupant 102, for whom an amount of spare attention capacity is being estimated.

At 206, the one or more computing devices implementing the dynamic attention capacity monitoring service may determine an estimated amount of spare attention capacity of an occupant of a vehicle, such as occupant 102 of vehicle 104. In some embodiments, the one or more computing devices implementing the dynamic attention capacity monitoring service, may alternatively determine weighting factors for determining the spare attention capacity of the occupant, and a local filtering application, such as filtering application 106, may determine the spare attention capacity of the occupant based on the weighting factors received from the dynamic attention capacity monitoring service and based on vehicle information received by the local filtering application.

At 208, the one or more computing devices implementing the dynamic attention capacity monitoring service provide the determined amount of spare attention capacity of the occupant of the vehicle to a local filtering application. Or, in embodiments, wherein the spare attention capacity of the occupant is determined by a local filtering application, the filtering application may provide the determined spare attention capacity information to a message filtering module of the filtering application in order to apply the determined spare attention capacity to filtering incoming messages or other information directed to the occupant of the vehicle.

At 210, the one or more computing devices implementing the dynamic attention capacity monitoring service determine one or more prioritization factors for the incoming messages or other information. For example, the one or more prioritization factors may include priority scores for each incoming message, or a ranking of messages in a queue of message to be presented to the occupant of the vehicle. In some embodiments, the prioritization factors may include prioritization weighting factors, wherein a local filtering application determines priority scores or prioritization rankings of incoming messages based on prioritization weighting factors received from a dynamic attention capacity monitoring service.

At 210, the one or more computing devices implementing the dynamic attention capacity monitoring service provide the determined prioritization factors to a local filtering application, implemented on a local device, local to the vehicle, and/or a mobile device in the vehicle such as a mobile phone, tablet, laptop, watch, etc.

Figure 2B:
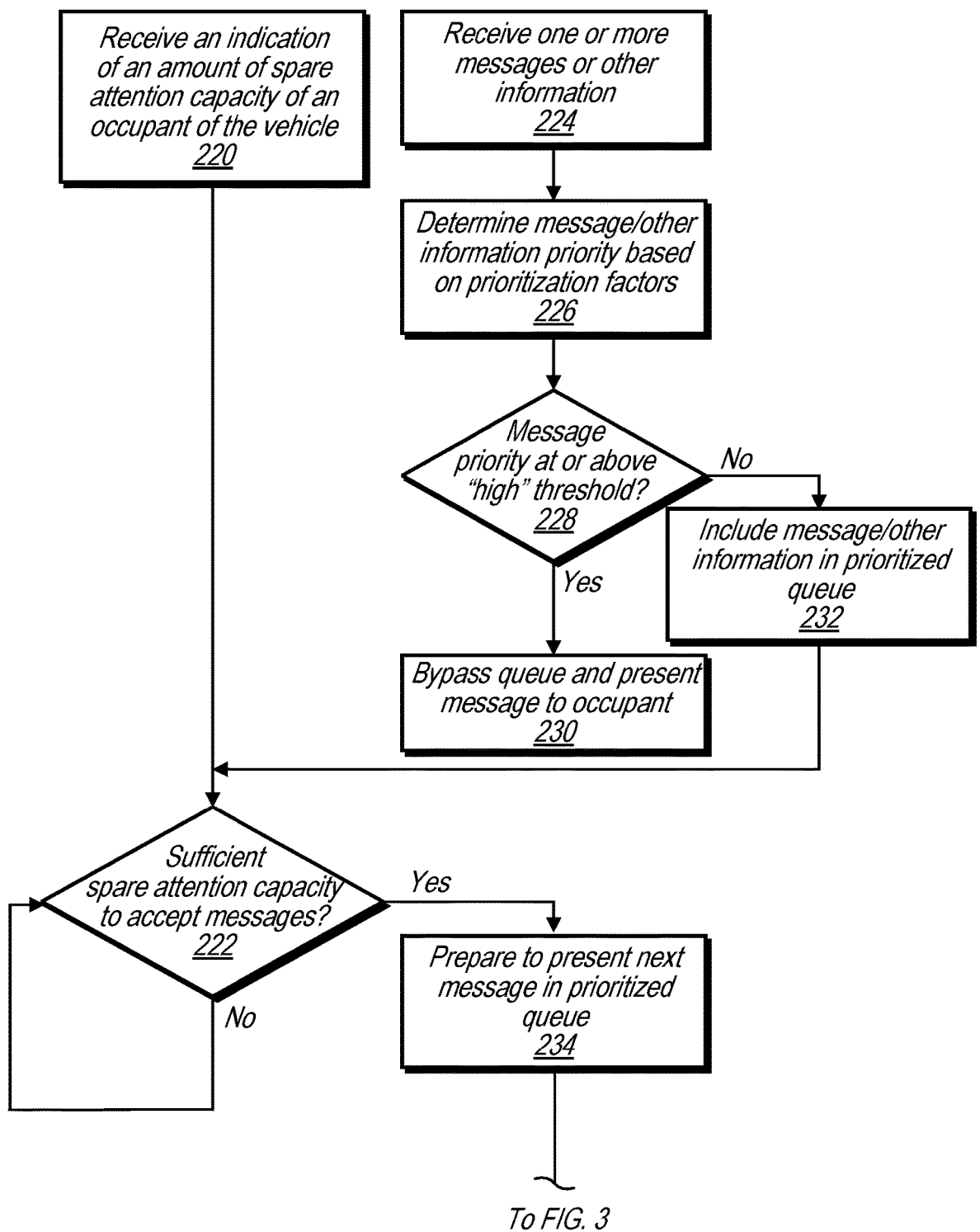
FIG. 2B illustrates a flowchart for filtering an incoming message or other information based on a determined spare attention capacity of an occupant of a vehicle and a priority of the incoming message or other information, according to some embodiments.

FIG. 2B illustrates a flowchart for filtering an incoming message (or other information) based on a determined spare attention capacity of an occupant of a vehicle and a priority of an incoming message (or other information), according to some embodiments.

For example, the steps illustrated in FIG. 2B may be performed by a filtering application, such as filtering application 106, based on information generated by a dynamic attention capacity monitoring service, such as dynamic attention capacity monitoring service 112. The dynamic attention capacity monitoring service may generate the spare attention capacity information as described in FIG. 2A and the filtering application may further utilize the received spare attention capacity information as described in FIG. 2B to filter messages directed to an occupant of a vehicle based on a dynamically determined amount of spare attention capacity of the occupant of the vehicle and based on priority information for incoming messages (or other information), according to some embodiments.

At 220, a filtering application receives an indication of an amount of spare attention capacity of an occupant of a vehicle. At 222, the filtering application determines if there is sufficient spare attention capacity for the occupant of the vehicle to be presented with a message, other information, or indicia of a message or other information (e.g. a condensed or summarized form of the message or other information). If so, the filtering application prepares to present a next message in a prioritized queue to the occupant. As discussed in more detail in FIG. 3, in some embodiments, the filtering application, the dynamic attention capacity monitoring service, or some combination thereof, may further modify the message or other information to reduce an amount of the occupant's attention that is consumed by the presentment of the message or an indicia of the message.

If there is insufficient spare attention capacity for the occupant to accept new messages, presentment of new messages may be delayed until the attention demands on the occupant are reduced such that the occupant has sufficient spare attention capacity to be presented with messages or other information.

In some embodiments, for an incoming message that cannot be promptly presented to an occupant of a vehicle due to insufficient spare attention capacity, a filtering application and/or a dynamic attention capacity monitoring service may cause a reply message to be sent to the sender of the incoming message. In some embodiments, the reply message may provide an explanation of the current conditions that are consuming the occupant's attention such that the occupant does not have spare attention capacity to receive the incoming message. For example, the reply message may state "I am currently driving in a rainstorm, I will receive your message when conditions improve." In some embodiments, the reply message may provide an estimated time when the message may be presented to the occupant of the vehicle. For example, the reply message may state "I am currently unable to receive messages, but am estimated to be able to view your message in the next 45 minutes." In some embodiments, a dynamic attention capacity monitoring service may learn phrases to use in auto-reply messages based on applying machine learning to historical messages sent by the occupant.

At 224, the filtering application also receives one or more messages or other information. For example, the one or more messages or other information may be received from an external source, such as external source 108. In some embodiments, the one or more messages may be text messages, e-mails, phone calls, social media posts, news, or other types of messages or information directed to an occupant of a vehicle from a source external to the vehicle. In some embodiments, the one or more messages may be initially received from the external source by another device, such as a mobile phone, and may be forwarded to the filtering application, for example in embodiments in which the filtering application is implemented on one or more computing devices that execute an operating system of a vehicle. In some embodiments, a filtering application may be downloaded to multiple devices, such that one or more computing devices that execute an operating system of a vehicle and a mobile device within the vehicle, both include a downloaded version of the filtering application.

At 226, the filtering application determines a priority score (or ranking) for the incoming message or other information. In some embodiments, the local filtering application may determine the priority score based on prioritization weighting factors received from a dynamic attention capacity monitoring service. Or, in some embodiments, the dynamic attention capacity monitoring service may determine a priority score (or ranking) and provide the priority score (or ranking) to the local filtering application.

At 228, the filtering application determines if the priority of the incoming message is at or above a high priority threshold. In some embodiments, if the incoming message is at or above the high priority threshold, at 230 the message may be presented to the occupant of the vehicle and may bypass a message queue of prioritized messages waiting to be presented to the occupant of the vehicle. However, if the message priority is below the high priority threshold, at 232, the incoming message may be included in a message queue of prioritized messages waiting to be presented to the occupant of the vehicle.

Figure 3:
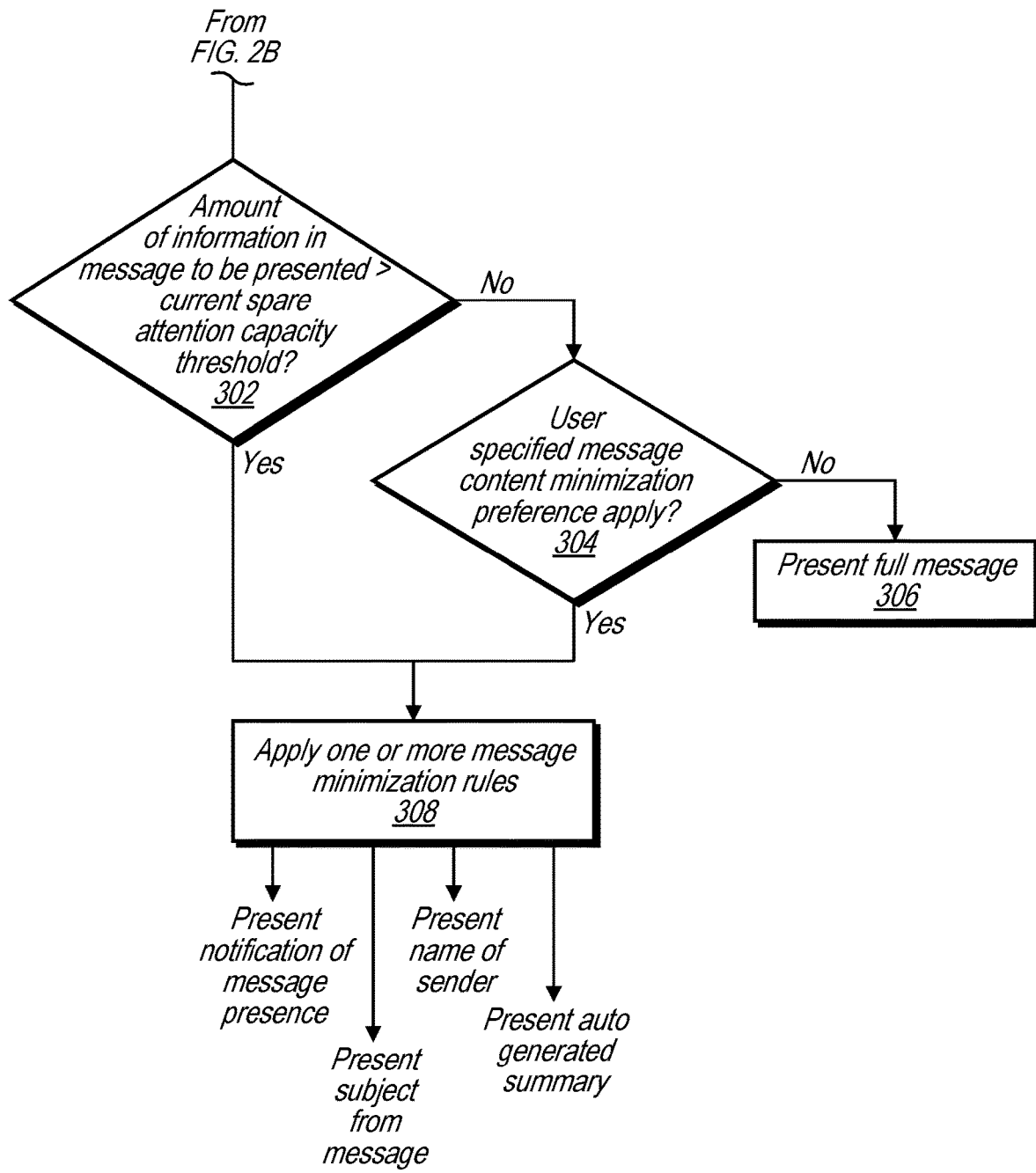
FIG. 3 illustrates a flowchart comprising additional steps for filtering an incoming message or other information based on a determined spare attention capacity of an occupant of a vehicle and a priority of the incoming message or other information, according to some embodiments.

FIG. 3 illustrates a flowchart comprising additional steps for filtering an incoming message or other information based on a determined spare attention capacity of an occupant of a vehicle and a priority of the incoming message or other information, according to some embodiments.

In some embodiments, a filtering application and/or a dynamic attention capacity monitoring service may reduce an amount of information included in a given message or piece of information into a limited summary presented to an occupant of a vehicle. In some embodiments, for a message with a given priority score, the filtering application may reduce the amount of information in the given message a first amount based on the occupant being estimated to have a first spare attention capacity and the application may pass the given message or piece of information having the particular priority score through the filtering for presentment to the occupant as a complete message or as an expanded summary based on the occupant being estimated to have a second spare attention capacity that is greater than the first spare attention capacity. Thus the degree to which information in an incoming message is reduced may vary based on the current spare attention capacity of the occupant of the vehicle and based on the priority of the message.

At 302, the filtering application and/or the dynamic attention capacity monitoring service determines if an amount of information included in the incoming message is greater than a current spare attention capacity of the occupant of the vehicle to process the information included in the incoming message. If the amount of information included in the incoming message is less than the spare attention capacity of the occupant of the vehicle, at 304 the filtering application and/or the dynamic attention capacity monitoring service determines if one or more user (e.g. occupant) specified message content minimization preferences apply to the incoming message. If the message fits within the spare attention capacity of the occupant and there are not any message content minimization rules that apply to the incoming message, the filtering application causes the full message to be presented to the occupant at 306. However, if the amount of information included in the message is greater than the current spare attention capacity of the occupant to safely receive the information and/or if one or more message content minimization rules apply to the incoming message, at 308 one or more message minimization rules are applied to the incoming message to reduce an amount of information from the incoming message or related to the incoming message that is presented to the occupant.

For example, an indication of a presence of a new message may be indicated to the occupant of the vehicle without providing more information about the incoming message. Alternatively, the subject of the incoming message may be presented to the occupant of the vehicle without providing more information about the incoming message. As another alternative, the name of the sender of the incoming message may be presented to the occupant without providing more information about the incoming message. As yet another alternative an automatically generated summary of the incoming message may be presented to the occupant of the vehicle. In some embodiments, various combinations of these alternatives may be presented to the occupant of the vehicle.

Figure 4:
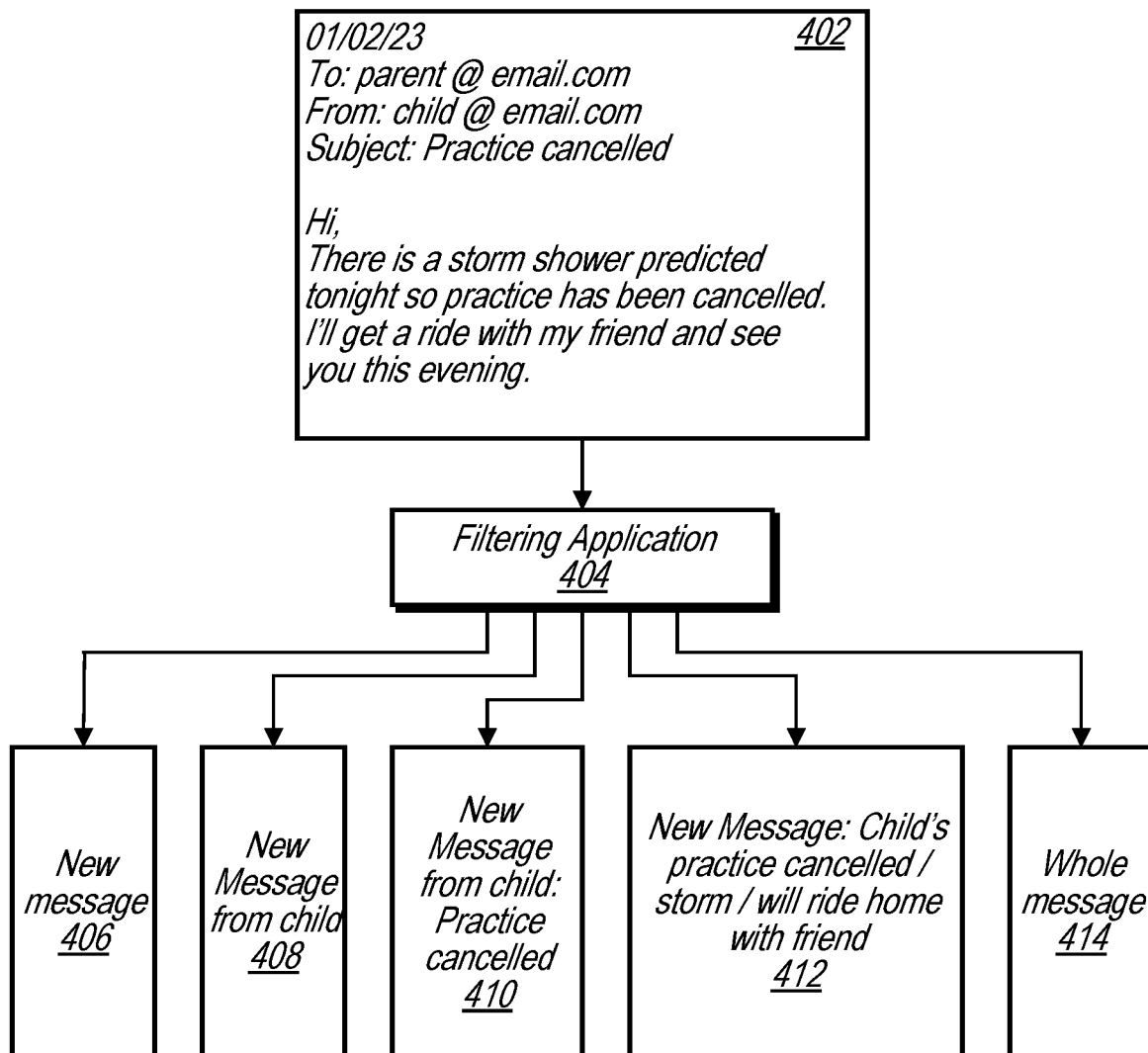
FIG. 4 illustrates an example incoming message being filtered to various degrees based on a determined spare attention capacity of an occupant of a vehicle and a priority of the incoming message, according to some embodiments.

FIG. 4 illustrates an example incoming message being filtered to various degrees based on a determined spare attention capacity of an occupant of a vehicle and a priority of the incoming message, according to some embodiments.

For example, FIG. 4 illustrates incoming message 402 being processed to varying degrees by filter application 404, which may be a similar filtering application as filtering application 106 shown in FIG. 1. For example, for a first spare attention capacity amount and message priority, the filtering application may simply present the occupant with an indication of a new message (406). For another spare attention capacity amount and message priority, the filtering application may simply present an indication of a message being received from the occupant's child without more (408). For yet another spare attention capacity amount and message priority, the filtering application may provide the subject of the message for presentment to the occupant of the vehicle, for example "practice canceled" (410). In some embodiments, the filtering application may further indicate the sender of the message along with the subject, such as "practice canceled/from child" (410). For yet another spare attention capacity amount and message priority, the filtering application may provide a more detailed automatically generated summary, or may request a dynamic attention capacity monitoring service provide the automatically generated summary. For example, the automatically generated summary generated from message 402 may read "child's practice cancelled/storm/will ride home with friend" (412). For yet another spare attention capacity amount and message priority, the filtering application may present the whole message (414).

In some embodiments, a filtering application, such as filtering application 404, may present the various alternatives discussed above as audio that is read to the occupant or visually, such as via a display of the vehicle. As discussed in more detail in FIGS. 12-14, in some embodiments interactive options may be presented to the occupant. For example, the occupant may be audibly presented with a prompt such as "new message" and provided with options such as "read" or "ignore." Also, in some embodiments, other interactive options arrays may be presented in response to a prompt such as a prompt of "new message from child" and interactive options of "read", "call back", "text", "ignore", etc. In some embodiments, the interactive options presented to the occupant of the vehicle may be dynamically adjusted based on the current estimated spare attention capacity of the occupant of the vehicle. For example, when the occupant has a low amount of spare attention capacity, the occupant may be presented with simple interactive options such as "read" or "ignore." And, when the occupant has a greater amount of spare attention capacity, the occupant may be presented with interactive options that consume more of the occupant's spare attention capacity such as "call back" or "dictate a text."

Figure 5A:
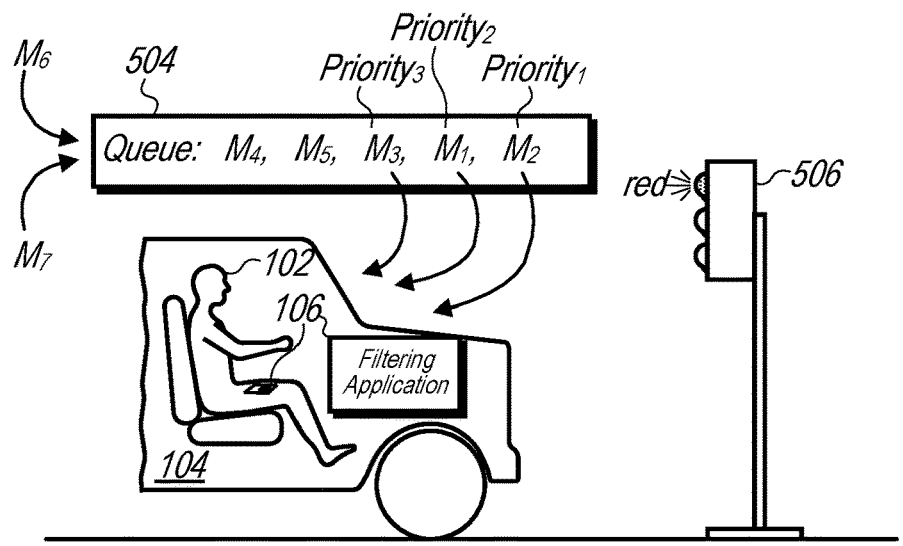
FIGS. 5A-5C illustrate example scenarios in which incoming messages are selectively held in a queue or presented to an occupant of a vehicle based on a determined spare attention capacity of the occupant of the vehicle and priority scores/rankings of the incoming messages, according to some embodiments.
Figure 5B:
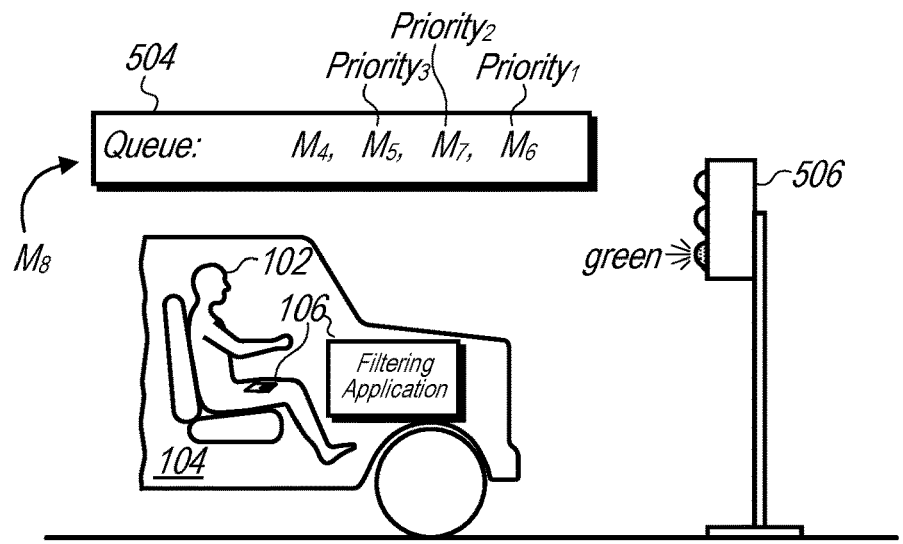
Figure 5C:
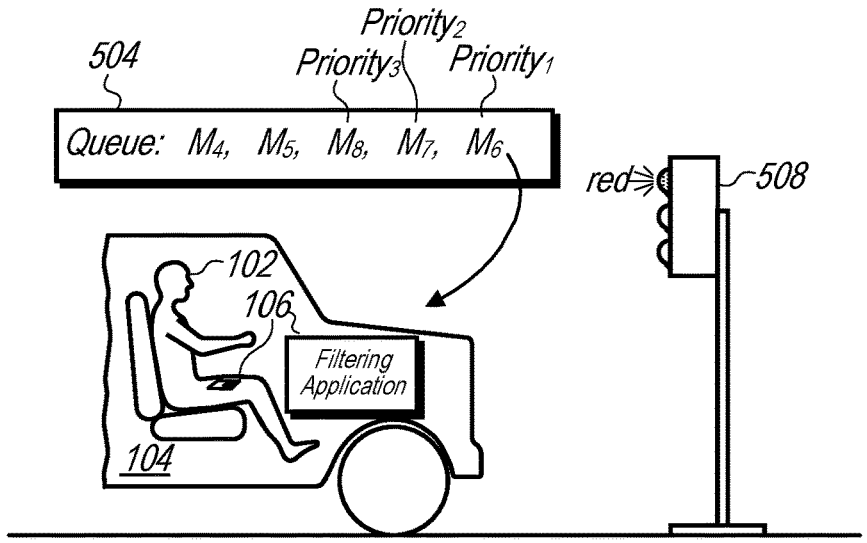

FIGS. 5A-5C illustrate example scenarios in which incoming messages are selectively held in a queue or presented to an occupant of a vehicle based on a determined spare attention capacity of the occupant of the vehicle and priority scores/rankings of the incoming messages, according to some embodiments.

For example, a dynamic attention capacity monitoring service, such as dynamic attention capacity monitoring service 112, and/or a filtering application, such as filtering application 106, may determine respective priority scores for respective incoming messages. The incoming messages may further be ordered in a queue based on the priority scores. For example, later received messages may be ordered in the queue ahead of earlier received messages, if the later received messages have a higher priority score than the earlier received messages. In some embodiments, ranking information for messages in a queue may be received from a dynamic attention capacity monitoring service, or may be determined locally by a filtering application.

As an example, FIG. 5A illustrates a queue 504 comprising incoming messages 1-5. Note that message 2, which was received after message 1, has a higher priority score than message 1 and is at the front of queue 504. After message 2, message 1 is the next message in queue 504 and has the next highest priority score. Following message 2 is message 3, message 4, and message 5. Additionally, messages 6 and 7 are incoming and will be placed in queue 504.

In FIG. 5A, traffic light 506 is red and vehicle 104 is at a stop waiting on traffic light 506 to change to green. While vehicle 104 is at a stop, occupant 102 has a sufficient spare attention capacity to be presented with additional messages. For example, a dynamic attention capacity monitoring service may determine that vehicle 104 is stopped and may provide spare attention capacity information for the occupant to a filtering application, wherein the spare attention capacity information reflects the increase in spare attention capacity of the occupant due to being stopped at traffic light 506. In response, filtering application 106, may cause messages 2, 1, and 3 to be removed from queue 504 and presented to occupant 102.

In FIG. 5B, traffic light 506 has changed to green. In response a dynamic attention capacity monitoring service may update spare attention capacity information for the occupant 102 indicating less spare attention capacity to be presented with messages. Thus, filtering application 106, may refrain from presenting additional messages to occupant 102. Additionally, more incoming messages may be added to queue 504. For example, incoming message 8, may be added to queue 504. Note that messages 6 and 7 received while at the red light in FIG. 5A have also been added to queue 504. Also, the messages in queue 504 have been ordered based on their respective priority scores, where message 6 has the highest priority and, messages 7, 5, and 4 are ordered in the queue behind message 6 based on their respective priority scores.

In FIG. 5C, vehicle 104 is stopped at a subsequent traffic light 508. While at traffic light 508, a dynamic attention capacity monitoring service and/or a filtering application may determine that the occupant's spare attention capacity has increased and may begin to present messages from queue 504 to occupant 102. For example, the highest priority message (e.g. message 6) may be presented to occupant 102 while stopped at traffic light 508.

As discussed above, in some embodiments, a priority score for a message (or other information) may be determined based on weighted prioritization factors, wherein the weighted prioritization factors are specified by the user, automatically determined based on user data, automatically determined based on historical data, or some combination thereof.

In some embodiments, presentment of messages may be ramped up and ramped down while vehicle 104 is stopped at a traffic light, such as traffic light 506 or 508. For example, a mapping application may know a duration of the traffic light and a dynamic attention capacity monitoring service and/or filtering application may ramp up the presentment of messages when first stopped at the traffic light and may ramp down the presentment of message when it is anticipated that the light will change from red to green.

In some embodiments, a dynamic attention capacity monitoring service may estimate an amount of time needed for an occupant of a vehicle to process a presented message and may ramp down presentment of new messages such that the occupant has sufficient time to process presented messaged before the traffic light changes from red to green.

In some embodiments, a user of a dynamic attention capacity monitoring service and/or filtering application may set or adjust one or more criteria for weighting incoming messages. For example, the user may define family member and may assign higher priorities to messages received from family members. In some embodiments, various other criteria or adjustment may be made.

Figure 6A:
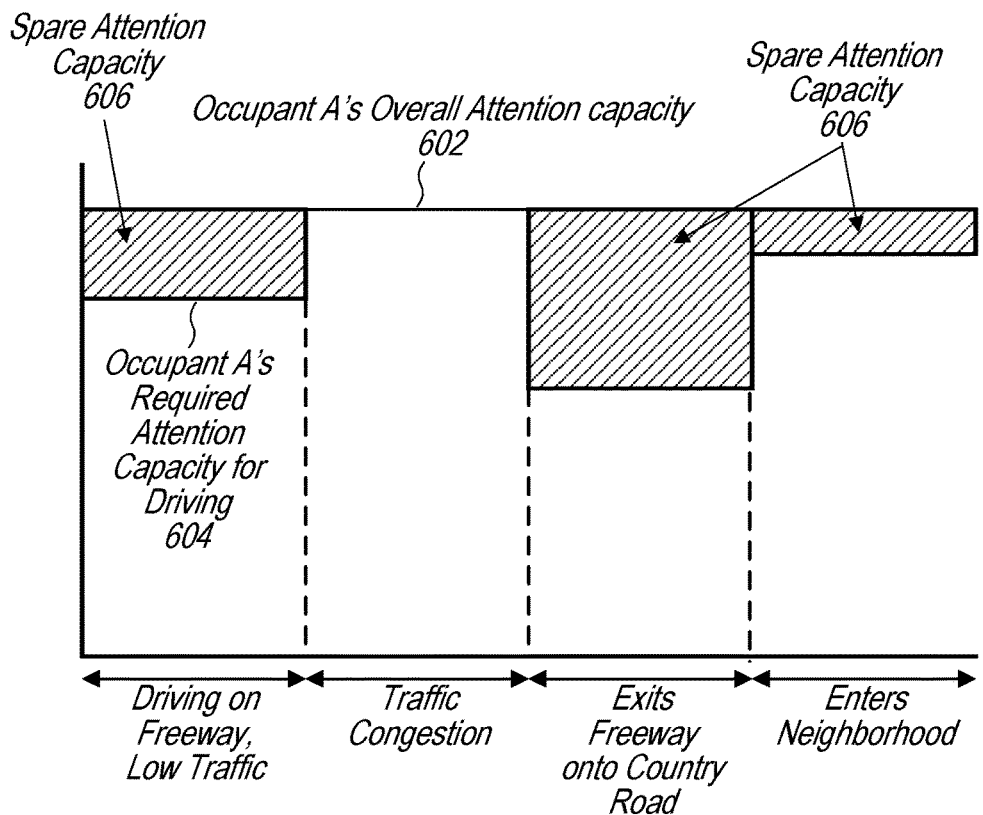
FIGS. 6A-6B illustrate examples of dynamically determined spare attention capacities of two different vehicle occupants, according to some embodiments.
Figure 6B:
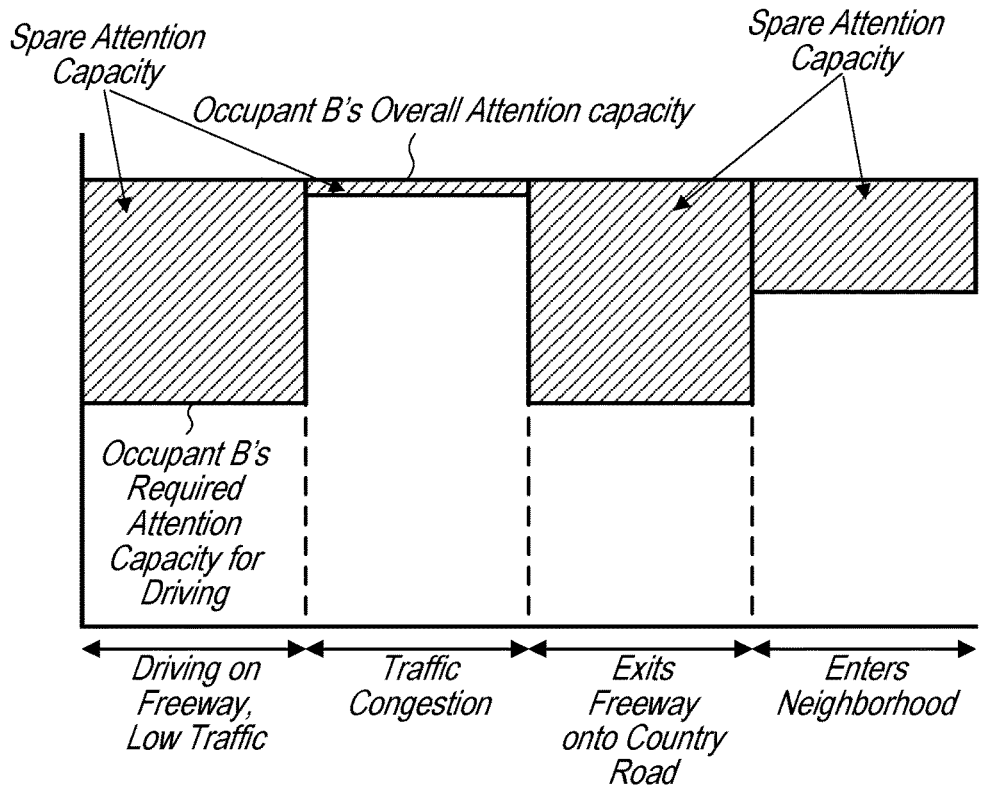

FIGS. 6A-6B illustrate examples of dynamically determined spare attention capacities of two different vehicle occupants, according to some embodiments.

FIG. 6A illustrates an overall attention capacity, required attention capacity, and spare attention capacity for occupant A. FIG. 6B illustrates an overall attention capacity, required attention capacity, and spare attention capacity for occupant B, which may be another occupant in another vehicle following a similar route as occupant A.

In some embodiments, a dynamic attention capacity monitoring service may determine an overall attention capacity of an occupant, such as overall attention capacity 602 of occupant A, based on historical data about occupant A, such as historical driving data. Also, the dynamic attention capacity monitoring service may determine a required attention capacity of the occupant, such as required attention capacity for driving 604, based on current conditions and historical driving data. In some embodiments, the dynamic attention capacity monitoring service and/or a filtering application may determine a spare attention capacity of an occupant, such as occupant A, based on a difference between the overall attention capacity of the occupant, such as overall attention capacity 602, and the required attention capacity of the occupant for operating the vehicle, such as the required attention capacity for driving 604. This difference may be the spare attention capacity 606. As can be seen in FIG. 6A, the spare attention capacity of an occupant may dynamically change based on conditions through which the vehicle is travelling. For example, while driving on a freeway in low traffic, the occupant may have a first spare attention capacity, and when encountering traffic congestion, the occupant's spare attention capacity may decrease. Then, when exiting the freeway onto a country road, the occupant's spare attention capacity may increase. However, the occupant's spare attention capacity may further decrease as the occupant enters a neighborhood. These changes may be determined by a dynamic attention capacity monitoring service and provided to a filtering application that uses this information to intelligently filter incoming messages directed to the occupant.

In some embodiments, a dynamic attention capacity monitoring service may customize the determination of an overall attention capacity, and required attention capacities for various conditions for each occupant or groups of occupants. For example, FIG. 6B illustrates an overall attention capacity, required attention capacity, and spare attention capacity for another occupant, occupant B. Occupant B may be another person in another vehicle following the same path as occupant A in FIG. 6A. However, as seen in FIG. 6B, a dynamic attention capacity monitoring service may determine a different overall attention capacity for occupant B, based on historical driving data. Also, for the various conditions, such as driving on a freeway in low traffic, traffic congestion, exiting the freeway onto a country road, and entering a neighborhood, the dynamic attention capacity monitoring service may determine different values for occupant B, that are different from the values determined for occupant A.

Figure 7A:
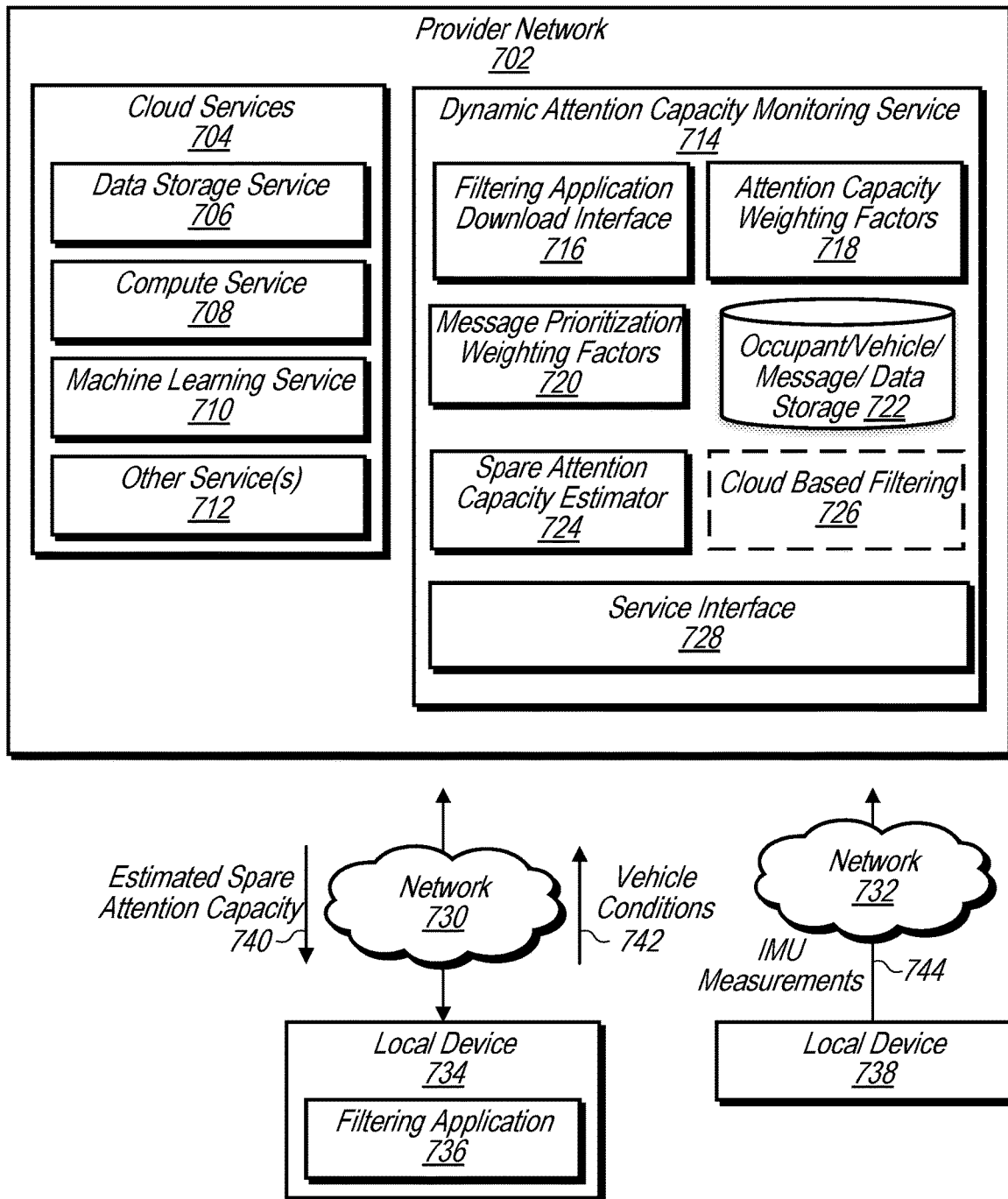
FIG. 7A illustrates an example configuration in which a cloud-based service dynamically determines an estimated spare attention capacity of an occupant of a vehicle and/or a priority of an incoming message or other information, according to some embodiments.

FIG. 7A illustrates an example configuration in which a cloud-based service dynamically determines an estimated spare attention capacity of an occupant of a vehicle and/or a priority of an incoming message or other information, according to some embodiments.

In some embodiments, a dynamic attention capacity monitoring service, such as dynamic attention capacity monitoring service 112, may be implemented as part of a provider network. For example, in some embodiments, dynamic attention capacity monitoring service 714 illustrated in FIGS. 7A-B and FIG. 8, may be a similar or same dynamic attention capacity monitoring service as dynamic attention capacity monitoring service 112.

In some embodiments, a provider network, such as a provider network 702 that includes dynamic attention capacity monitoring service 714, may include various other cloud services, such as cloud services 704. In some embodiments, cloud services 704 may include data storage service 706, compute service 708, machine learning service 710, and other services 712. In some embodiments, a dynamic attention capacity monitoring service, such as dynamic attention capacity monitoring service 714, may utilize one or more cloud services 704 to determine spare attention capacity weighting factors, message prioritization weighting factors, a spare attention capacity, message priority scores, message rankings, etc. For example, a machine learning service, such as machine learning service 710, may analyze historical data related to an occupant of a vehicle that is stored in data storage service 706 to determine message prioritization weighting factors for messages directed to the occupant. In a similar manner, a machine learning service, such as machine learning service 710, may analyze historical data related to an occupant of a vehicle that is stored in data storage service 706 to determine attention capacity weighting factors for the occupant. In some embodiments, a dynamic attention capacity monitoring service, such as dynamic attention capacity monitoring service 714, may utilize computing service 708 to process vehicle information and other information such as weather information, map information, traffic information, etc. to determine a current spare attention capacity of a an occupant of a vehicle, wherein the spare attention capacity of the occupant is determined based on the spare attention capacity weighting factors determined by the machine learning service 710.

In some embodiments, a dynamic attention capacity monitoring service, such as dynamic attention capacity monitoring service 714, may include a filtering application download interface 716, a store for attention capacity weighting factors 718, and a store for message prioritization weighting factors 720. In some embodiments, a dynamic attention capacity monitoring service, such as dynamic attention capacity monitoring service 714, may store occupant/vehicle/message data in a store, such as store 722. In some embodiments, store 722 may be implemented using a cloud-based storage service, such as data storage service 706. In some embodiments, a dynamic attention capacity monitoring service, such as dynamic attention capacity monitoring service 714, may include a spare attention capacity estimator 724. In some embodiments, the spare attention capacity estimator 724 may be implemented via compute service 708 and may include a model for determining a current spare attention capacity of an occupant of a vehicle based on current vehicle information and attention capacity weighting factors, such as attention capacity weighting factors 718.

In some embodiments, dynamic attention capacity monitoring service 714 may receive vehicle conditions from data collected by a filtering application 736 downloaded to a local device 734, such as a vehicle operating system. The vehicle conditions may be communicated to the dynamic attention capacity monitoring service via network 730 and service interface 728. Also, one or more other local devices 738, such as a mobile device of the occupant in the vehicle, may send information about the vehicle to the dynamic attention capacity monitoring service 714. For example, local device 738 sends inertial measurement unit (IMU) measurements 744 to dynamic attention capacity monitoring service 714 via network 732 and service interface 728.

Also, dynamic attention capacity monitoring service 714 sends estimated spare attention capacities 740 to filtering application 736, wherein the filtering application 736 uses a current estimated spare attention capacity of the occupant of the vehicle to determine how to filter an incoming message directed to the occupant of the vehicle. In some embodiments, the filtering application 736 may alternatively or additionally dynamically determine interactive options to be presented to the occupant of the vehicle.

In some embodiments, message filtering may be optionally performed in the provider network 702 by cloud based filtering application 726 instead of or in addition to being performed on a local device, such as local device 734 or 738.

Figure 7B:
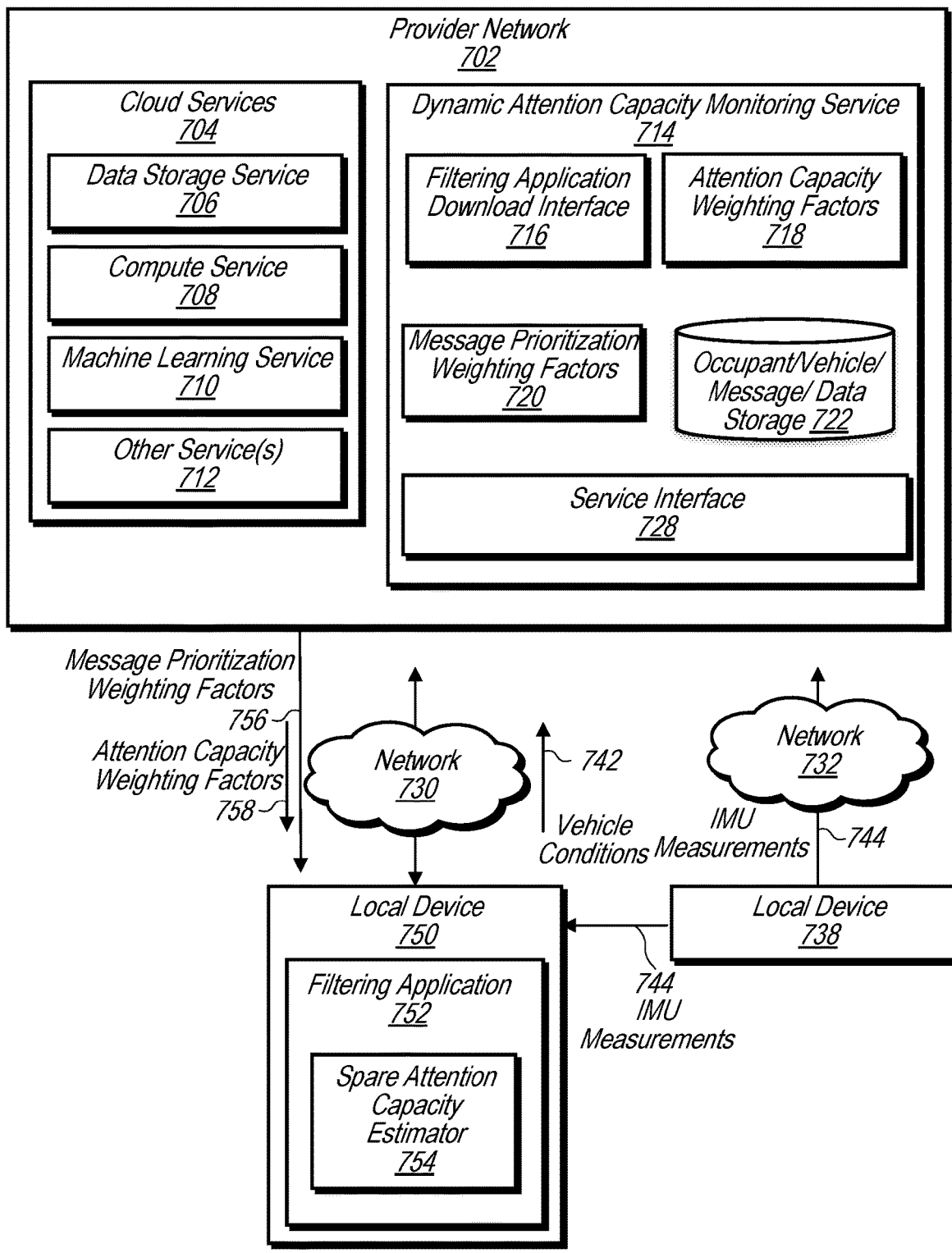
FIG. 7B illustrates an example configuration in which a local device dynamically determines an estimated spare attention capacity of an occupant of a vehicle and/or a priority of an incoming message or other information based on dynamically determined weighting factors received from a cloud-based service, according to some embodiments.

FIG. 7B illustrates an example configuration in which a local device dynamically determines an estimated spare attention capacity of an occupant of a vehicle and/or a priority of an incoming message or other information based on dynamically determined weighting factors received from a cloud-based service, according to some embodiments.

Dynamic attention capacity monitoring service 714 illustrated in FIG. 7B may be similar to the dynamic attention capacity monitoring service 714 illustrated in FIG. 7A. However, as shown in FIG. 7B, in some embodiments the spare attention capacity estimator may be implemented in the filtering application on the local device(s) as opposed to being implemented in the dynamic spare attention capacity monitoring service in the provider network.

For example, dynamic attention capacity monitoring service 714 receives vehicle conditions 742 and IMU measurements 744 and provides message prioritization factors 756 and attention capacity weighting factors 758 to spare attention capacity estimator 754 implemented as part of filtering application 752 on local device 750. In some embodiments, IMU measurements 744 may also be provided to spare attention capacity estimator 754 for use in determining a current estimated spare attention capacity of an occupant.

Figure 8:
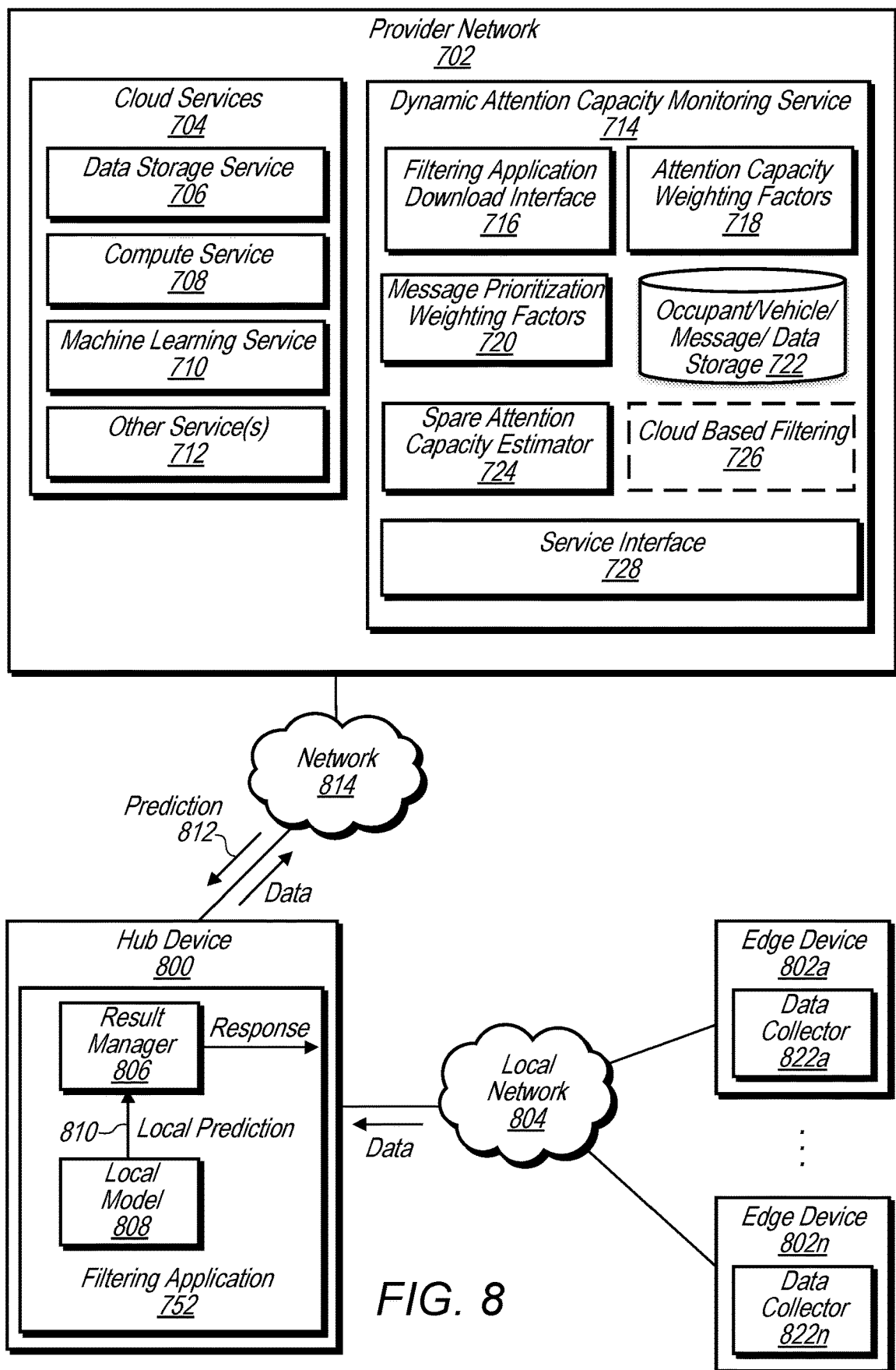
FIG. 8 illustrates an example configuration wherein a filtering application of a local device acts as a hub device for a system implementing split prediction using a local model on the hub device and a remote model of a provider network, according to some embodiments.

FIG. 8 illustrates an example configuration wherein a filtering application of a local device acts as a hub device for a system implementing split prediction using a local model on the hub device and a remote model of a provider network, according to some embodiments.

In some embodiments, a remote provider network and a local network device (e.g., hub device or edge device) may be used to generate a split prediction of a spare attention capacity of an occupant. For example, a hub device of a local network in a vehicle may receive data from sensors and process the data using a local model (e.g., data processing model) to generate a local prediction. The sensor data may also be transmitted to a remote provider network, such as a dynamic attention capacity monitoring service implemented in a remote provider network, which returns another prediction. If the returned prediction from the provider network is more accurate, then the local prediction may be corrected by the returned prediction.

In some embodiments, a provider network and/or a hub device may update local data models of edge devices based on data collected by the edge devices. For example, a provider network and/or a hub device may periodically receive data from edge devices and generate new updates to local models based on the new data. The provider network and/or a hub device may then deploy the updates to the respective edge devices. In some embodiments, entirely new versions of the local models are deployed to replace current models of the respective edge devices.

In some embodiments, multiple models may be implemented across multiple respective edge devices (e.g., tier devices) of a network. Some tier devices may implement larger, more accurate models than other tier devices. When a tier device receives data (e.g., from a sensor), the tier device may decide whether to process the data using a local model of the tier device or to send the data on to another tier device that has a larger, more accurate model for processing the data.

As used herein, a model may be any data processing model suitable for processing input data to generate one or more results, such as a model for determining a spare attention capacity of an occupant of a vehicle. For example, a model may include a neural network, deep neural network, static or dynamic neural network, a memory network, and/or any other model architecture suitable for processing the collected data and generating one or more results/predictions. Thus, in some embodiments, a model may include any computational model, machine learning model, or artificial intelligence model suitable for processing data and generating one or more results. Moreover, in some embodiments, different devices (e.g., edge devices, tier devices, hub devices, servers, etc.) may include different model architectures and/or be trained based on the same or different training data.

In various embodiments, any suitable security communication protocols may be used to protect data that is being sent between any devices (e.g., edge devices, tier devices, hub devices, servers, etc.) and between devices of different networks (e.g., local networks, cellular networks, provider networks). For example, data may be encrypted using SSL (secure socket layer), TLS (transport layer security), HTTPS (secure hypertext transfer protocol), and/or any other suitable network security protocol.

In some embodiments, any of the data collected by a data collector (e.g., sensor) may be converted into training data and used to train models and/or generate updates to models. Thus, analyzing data and/or generating a model based on the analysis may include creating training data and creating modifications and/or updates to the model based on the training data.

The term "prediction" is used herein for various examples. However, in various embodiments and in the figures, any other suitable result (e.g., non-prediction result) may be substituted for a prediction. A result may be an identification based on data received from a sensor.

FIG. 8 illustrates a system for implementing a split prediction based on a local model of a hub device and a provider network, according to some embodiments. A hub device 800, a provider network 702, local network 804, edge devices 802, and any other components depicted in FIG. 8 may be the same as or include one or more of the same components as shown in FIGS. 1, 5A-C, 7A-B, or 12.

In some embodiments, multiple hub devices may be used as redundant hub devices to add fault-tolerance to the system. If one or more hub devices fail, a remaining one or more hub devices may continue to operate as described. Thus, in some embodiments, a hub device may synchronize state with one or more other hub devices (e.g., at periodic intervals or upon detecting an event such as addition of a new hub device or failure of a hub device).

In some embodiments, two or more hub devices may collectively perform the various described operations instead of just one hub device. Thus, two or more hub devices may each perform a particular portion of the described operations (e.g., distributed processing). In other embodiments, a combination of redundant and distributed processing may be implemented via two or more hub devices. In embodiments, the hub device may represent any compute devices described herein, including an edge device or tier device.

In the depicted embodiment, the hub device 800 includes a local model 808 that may receive data from one or more edge devices 802 and process the received data. The local model 808 may include software and/or hardware that performs one or more operations on received data. In some embodiments, the one or more operations may include analyzing the data, modifying the data based on the analyzing, and/or generating a result based on the analyzing (e.g., prediction, new data, one or more commands, or some other result). For example, the result may be a local prediction 810. In embodiments, the local prediction may be received by a result manager 806.

In some embodiments, the hub device 800 (e.g., the result manager 806) may also transmit the data received from one or more edge devices 802 to the provider network 702 and to dynamic attention capacity monitoring service 714. The data may be transmitted via a wide-area network 814 (e.g., the internet). Thus, the provider network 702 may be considered a remote provider network and may be in another physical location than the hub devices, such as another city, state, or country. In embodiments, the provider network 702 includes a dynamic attention capacity monitoring service 717 that includes a model for a spare attention capacity estimator 724 that receives the data from the hub device 800 and processes the received data.

Similar to the local model 808, the model for the spare attention capacity estimator 724 may include software and/or hardware that performs one or more operations on received data. In embodiments, the one or more operations may include analyzing the data, modifying the data based on the analyzing, and/or generating a result based on the analyzing (e.g., prediction, new data, one or more commands, or some other result). For example, the result may be a prediction 812. The dynamic attention capacity monitoring service 714 may then transmit the prediction 812 to the hub device 800 via the network 814.

In embodiments, the result manager 806 receives the prediction 812. The result manager 806 may then determine whether to correct the local prediction 810 based on the prediction 812 and/or the local prediction 810. If the result manager 806 determines not to correct the local prediction 810, then the result manager 806 generates a response based on the local prediction 810. For example, the result manager 806 may generate a command or other message that causes the hub device 800 to perform an action, such as filtering an incoming message. In embodiments, the result manager 806 may send the command or message to an endpoint, such as another edge device of the local network 804 or another computing device outside of the local network 804. For example, the results manager may send the command to a cell phone in the vehicle to present the message to the occupant, or may send the command to a remote server to cause a message to be presented to the occupant.

If the result manager 806 determines to correct the local prediction 810, then the result manager 806 corrects the local prediction 810 based on the prediction 812. For example, the result manager 806 may modify the local prediction 810 based on the prediction 812. In some embodiments, to correct the local prediction 810, the result manager 806 replaces the local prediction 810 with the prediction 812.

In embodiments, the result manager 806 then generates a response based on the corrected prediction. For example, the result manager 806 may generate a command or other message that causes the hub device 800 to perform an action, such as causing filtering application 752 to filter an incoming message based on an estimated spare attention capacity determined based on local model 808 or a remote model, such as a model of spare attention capacity estimator 724. In embodiments, the result manager 806 may send the command or message to an endpoint, such as another edge device of the local network 804 or another computing device outside of the local network 804.

As shown in the depicted embodiment, each edge device 802 may include a data collector 822. The data collector 822 may include any suitable device for collecting and/or generating data and sending the data to the hub device 800.

Figure 9:
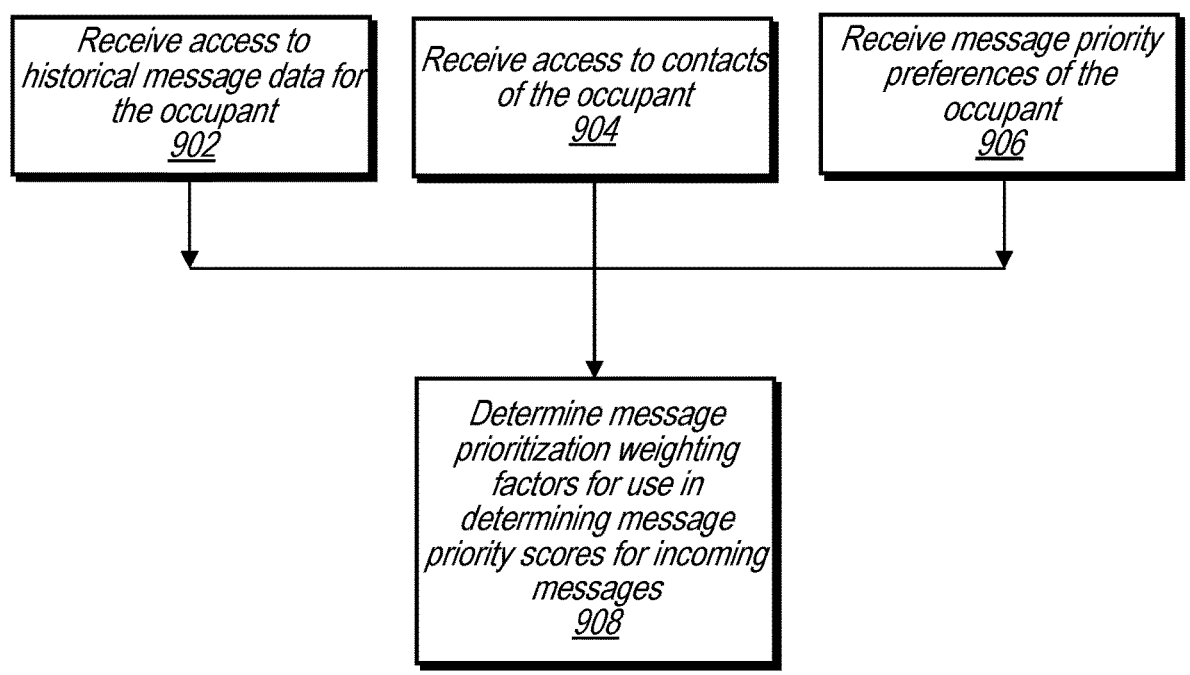
FIG. 9 illustrates a flowchart for determining prioritization weighting factors for incoming messages, according to some embodiments.

FIG. 9 illustrates a flowchart for determining prioritization weighting factors for incoming messages, according to some embodiments.

At 902, a dynamic attention capacity monitoring service receives access to historical message data for the occupant. At 904 the dynamic attention capacity monitoring service receives access to contacts of the occupant. At 906, the dynamic attention capacity monitoring service receives message priority preferences of the occupant.

At 908, the dynamic attention capacity monitoring services determines message prioritization weighting factors based on the information received at 902, 904, and 906. In some embodiments the message prioritization weighting factors may be determined based on more or less data. For example, in some embodiments, a user may opt out of providing access to historical message data and/or the user's contacts, and the dynamic attention capacity monitoring service may learn message prioritization weighting factors based on future user behavior and/or user supplied rules or preferences, such as preferences 906.

In some embodiments, a dynamic attention capacity monitoring service may create a profile for an occupant and may prioritize messages based on the profile. For example, the dynamic attention capacity monitoring service may include in the profile that the user is a vice president of corporation XYZ and may assign a high priority to news events related to corporation XYZ, as an example.

Figure 10:
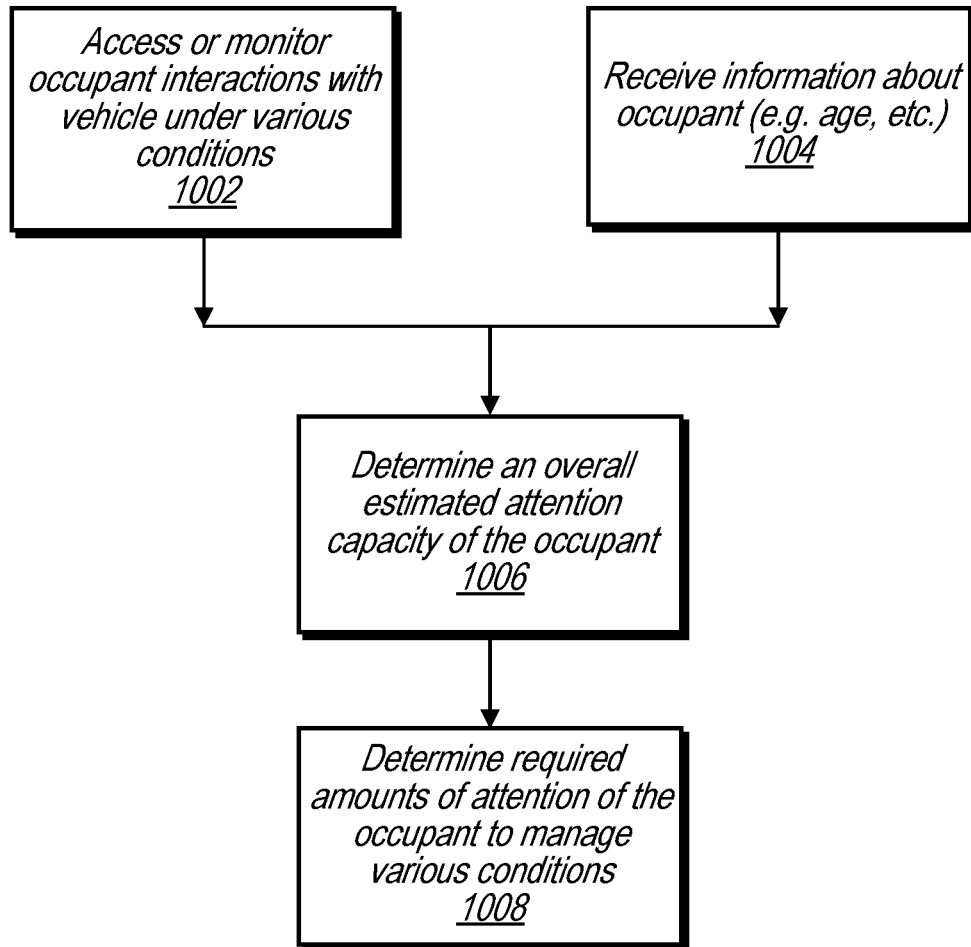
FIG. 10 illustrates a flowchart for determining an overall attention capacity of an occupant of a vehicle, according to some embodiments.

FIG. 10 illustrates a flowchart for determining an overall attention capacity of an occupant of a vehicle, according to some embodiments.

At 1002, a dynamic attention capacity service accesses historical data regarding occupant interactions with the vehicle under various conditions or monitors real-time data regarding occupant interactions with the vehicle under various conditions. At 1004, the dynamic attention capacity monitoring service optionally receives information about the occupant, such as age, eyesight, driving experience, etc. For example, in some embodiments, the occupant may complete a profile or may otherwise provide access to such information.

At 1006, the dynamic attention capacity monitoring service determines an overall estimated attention capacity of the occupant based on the information received at 1002, 1004, or both. Additionally, at 1008, the dynamic attention capacity monitoring service determines required respective amounts of attention capacity required of the occupant under various conditions based on the information received at 1002, 1004, or both. In some embodiments, the determined overall attention capacity of the occupant and the respective amounts of attention capacity required of the occupant under various conditions may be used by the dynamic attention capacity monitoring service to determine a spare attention capacity for the occupant under a given condition.

Figure 11:
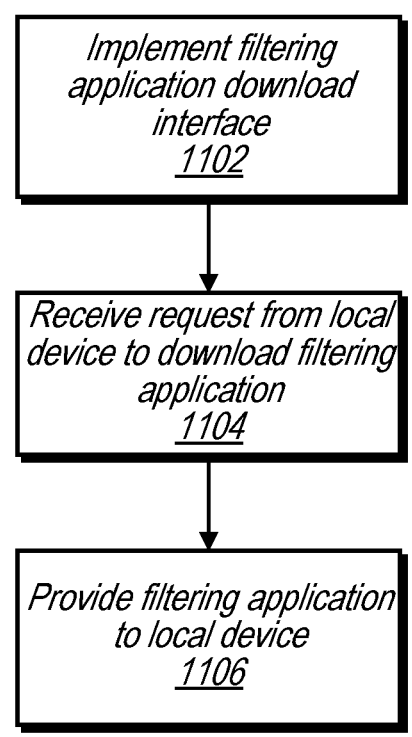
FIG. 11 illustrates a flowchart for implementing a service interface and providing a client device with an application for filtering incoming messages based on a dynamically determined spare attention capacity of an occupant of a vehicle, according to some embodiments.

FIG. 11 illustrates a flowchart for implementing a service interface and providing a client device with an application for filtering incoming messages based on a dynamically determined spare attention capacity of an occupant of a vehicle, according to some embodiments.

At 1102, a dynamic attention capacity monitoring service implements a filtering application download interface, such as filtering application download interface 118. At 1104, the dynamic attention capacity monitoring service, receives, via the filtering application download interface, a request from a local device, local to the vehicle or occupant, to download the filtering application, such as filtering application 106. At 1106, the filtering application download interface makes the filtering application available for download to the local device.

Figure 12A:
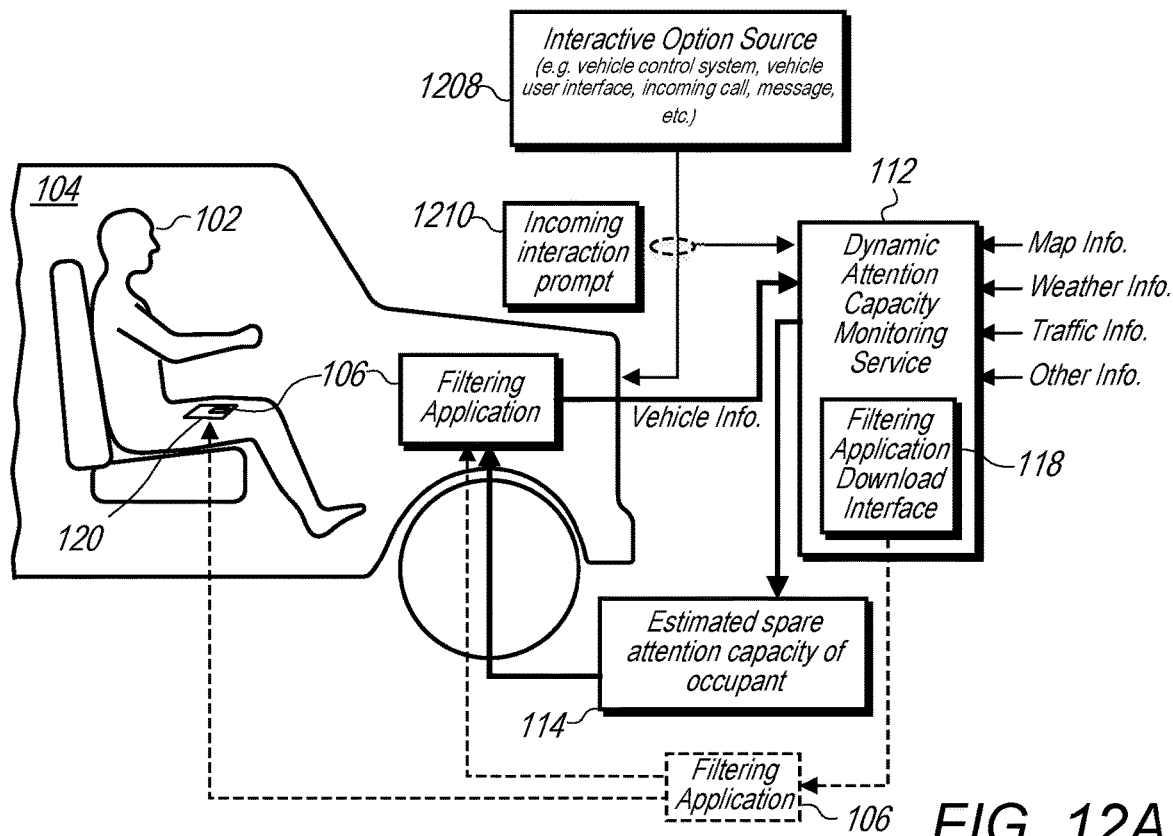
FIG. 12A illustrates a dynamic attention capacity monitoring system interacting with local devices in a vehicle to dynamically determine interactive options to be presented to an occupant of the vehicle, according to some embodiments.

FIG. 12A illustrates a dynamic attention capacity monitoring system interacting with local devices in a vehicle to dynamically determine interactive options to be presented to an occupant of the vehicle, according to some embodiments.

Dynamic attention capacity monitoring service 112, filtering applications 106, vehicle 104, occupant 102, mobile device 120, and "estimated spare attention capacity of occupant 114" may be the same or similar to corresponding features illustrated in FIG. 1A. However, in FIG. 12A, an incoming interaction prompt 1210 may be detected by dynamic attention capacity monitoring service 112, and filtering application 106 may dynamically determine interactive options to present to occupant 102 in response to the incoming interaction prompt 1210. For example, in some embodiments, presentation of the interactive options may be dynamically determined based on a current estimated spare attention capacity of an occupant, such as occupant 102, and/or a priority of the incoming interaction prompt 1210.

In some embodiments, the incoming interaction prompt may be received from a source external to the vehicle or internal to the vehicle. For example, FIG. 12A illustrates incoming interaction prompt 1210 being received from interactive option source 1208. In some embodiments, interactive option source 1208 may be a vehicle control system, such as system that controls how the vehicle drives, a system relating to maintenance of the vehicle, an autonomous, semi-autonomous, or driver assistance system of the vehicle etc. In some embodiments, interactive option source 1208 may be a vehicle user interface, such as a navigation interface, vehicle entertainment interface (e.g. for controlling vehicle audio, video, gaming, etc.). In some embodiments, the interactive option source may be an incoming call, message, or other information from a source external to the vehicle which prompts a vehicle user interface to present interactive options to an occupant of a vehicle. In some embodiments, the interactive options may be presented audibly, for example via speakers and a microphone of the vehicle. In some embodiments, the interactive options may be presented visually, for example via a touch interface of the vehicle, a display and selection interface (e.g. knobs, etc.) of the vehicle, a heads-up display of the vehicle, or other interface of the vehicle.

In some embodiments, dynamically determining interactive options to present to an occupant of a vehicle based on an estimated spare attention capacity may be performed such that an array of interactive options presented to the occupant of the vehicle does not exceed an ability of the occupant to process and/or respond to the interactive options without exceeding a safe level of attention distraction.

Figure 12B:
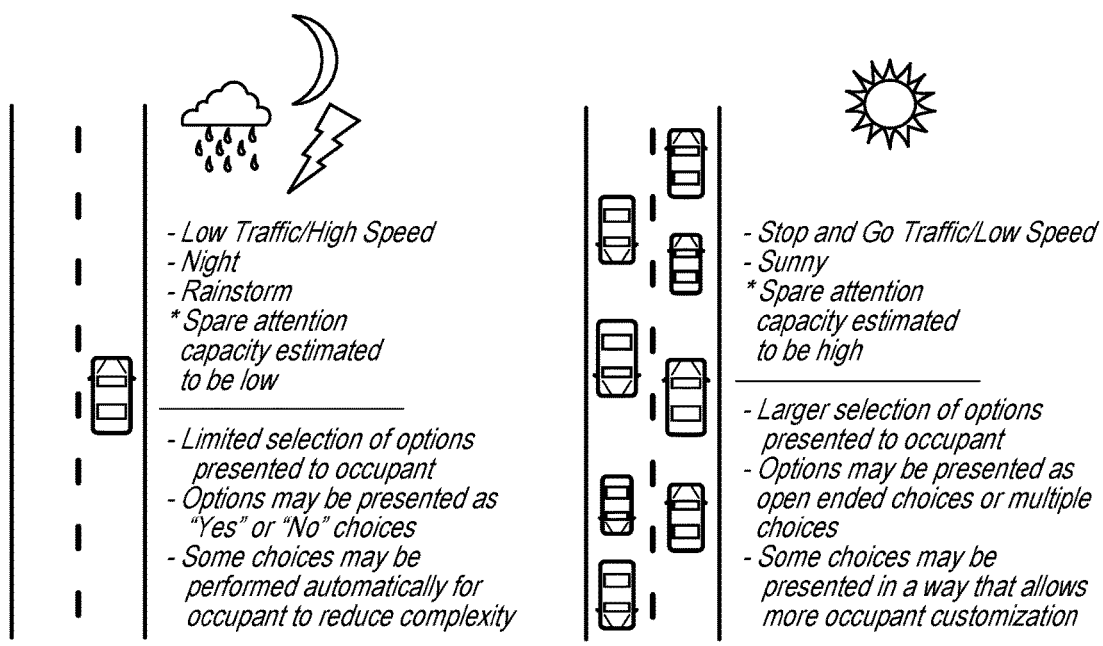
FIG. 12B illustrates example conditions within which a vehicle may be operating and different interactive options filtering responses for the example conditions, according to some embodiments.

FIG. 12B illustrates example conditions within which a vehicle may be operating and different interactive options filtering responses for the example conditions, according to some embodiments.

For example, as shown in FIG. 12B, when a spare attention capacity of an occupant of a vehicle is estimated to be low, a limited selection of interactive options may be presented to the occupant. For example, the interactive options that are presented to the occupant may be presented in a format that requires a minimal response from the occupant, such as "Yes" or "No" choices. Also, when a spare attention capacity of an occupant of a vehicle is estimated to be low some choices may be taken on behalf of the occupant without requiring a response. For example, an automatic reply message may be sent if the occupant decides to ignore a call, as an example. As another example, when a spare attention capacity of an occupant of a vehicle is estimated to be high, a larger array of interactive options may be presented to the occupant, and/or the interactive options presented to the occupant may allow for more customization and may require more response effort on behalf of the occupant. For example, interactive options may allow an occupant to select a response from a list of possible responses (e.g. more choices than just "Yes" or "No"). Also, the interactive options may be open-ended wherein an occupant can supply a customized response, such as dictating a response message.

As another example of a prompt and interactive responses, a filtering application may detect a child is fastened into a child seat as an incoming interaction prompt. Based on the occupant's spare attention capacity, the filtering application may present the occupant with interactive vehicle entertainment options. For example, if the occupant's spare attention capacity is estimated to be low, the filtering application, such as filtering application 106, may provide interactive options such as "play movie Yes or No", and may automatically select a movie to play, if the response is "Yes". However, if the occupant is estimated to have a higher spare attention capacity, the filtering application may present the occupant with a list of movies to select from. In some embodiments, interactive options may be multi-layered. For example, the filtering application may present an array of genres of movies and upon selection of a particular genre, may then present the occupant with a list of movies within that genre. In some embodiments, a filtering application, such as filtering application 106, may adjust a number of layers used when presenting interactive options based on a spare attention capacity of an occupant of a vehicle. For example, in the movie selection example, fewer layers allowing for customization of the types of moves to be included in a list of movie options may be presented when estimated spare attention capacity is low, and more layers allowing for customization may be presented when estimated spare attention capacity is high.

Figure 13A:
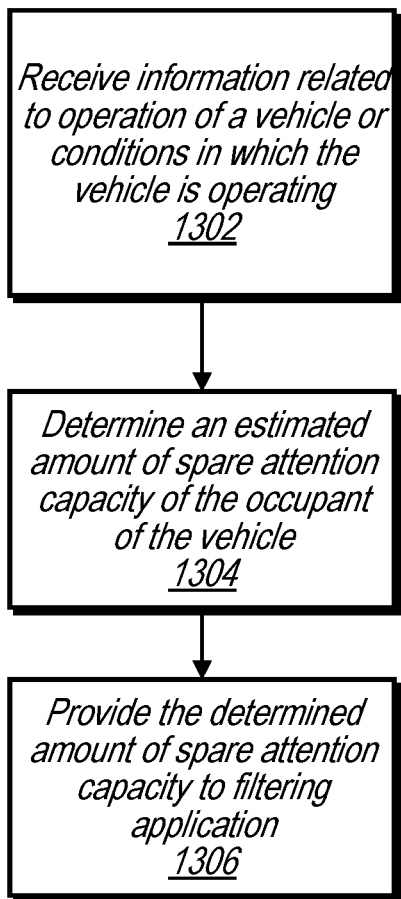
FIG. 13A illustrates a flowchart for determining an estimated amount of spare attention capacity of an occupant of a vehicle, according to some embodiments.

FIG. 13A illustrates a flowchart for determining an estimated amount of spare attention capacity of an occupant of a vehicle, according to some embodiments.

At 1302, a dynamic attention capacity monitoring service, such as dynamic attention capacity monitoring service 112 or dynamic attention capacity monitoring service 714, receives information related to operation of a vehicle or conditions in which the vehicle is operating. As discussed above in regard to 202 of FIG. 2A, the information may be received from a variety of sources.

At 1304, the dynamic attention capacity monitoring service determines an estimated amount of spare attention capacity of the occupant of the vehicle. In some embodiments, the estimated amount of spare attention capacity of the occupant of the vehicle may be determined in a similar manner as discussed above in regard to 206 of FIG. 2A. However, in some embodiments in which the estimated spare attention capacity is to be used to dynamically determine interactive options to be presented to the occupant, the estimated spare attention capacity may be determined without reference to message monitoring.

At 1306, the determined estimated spare attention capacity is provided to a filtering application in a similar manner as described for 208 of FIG. 2A.

Figure 13B:
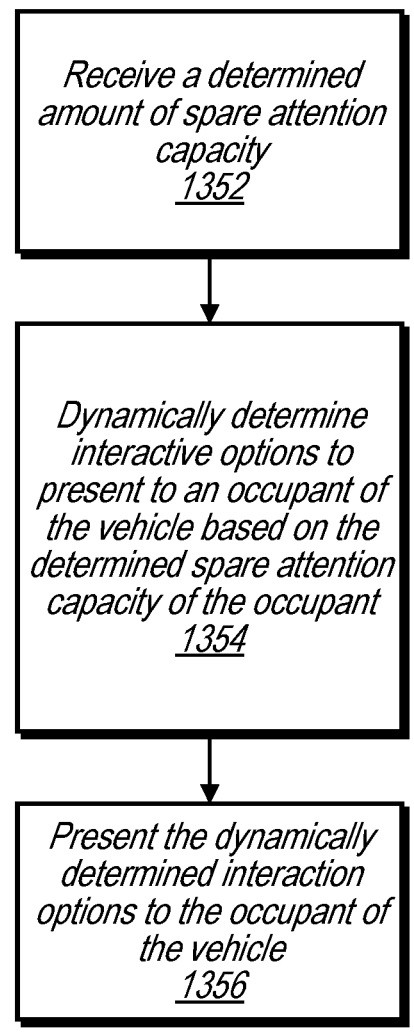
FIG. 13B illustrates a flowchart for using a determined estimated amount of spare attention capacity of an occupant of a vehicle to dynamically determine interactive options to be presented to the occupant of the vehicle, according to some embodiments.

FIG. 13B illustrates a flowchart for using a determined estimated amount of spare attention capacity of an occupant of a vehicle to dynamically determine interactive options to be presented to the occupant of the vehicle, according to some embodiments.

At 1352, a determined estimated amount of spare attention capacity is received by a filtering application from a spare attention capacity monitoring service or from the filtering application itself, wherein the filtering application determines the estimated spare attention capacity based on weighting factors received from a spare attention capacity monitoring service and based on the information received at 1302.

At 1354, the filtering application dynamically determines interactive options to present to an occupant of the vehicle based on the determined spare attention capacity of the occupant. In some embodiments, the interactive options to be presented to the occupant of the vehicle may further be dynamically determined based on a priority score of an incoming prompt that triggered the presentment of the interactive options.

At 1356, the dynamically determined interactive options are presented to the occupant of the vehicle. In some embodiments, the dynamically determined interactive options may be presented audibly via speakers and microphone, or may be presented visually, for example via a screen and a user interface.

Figure 14:
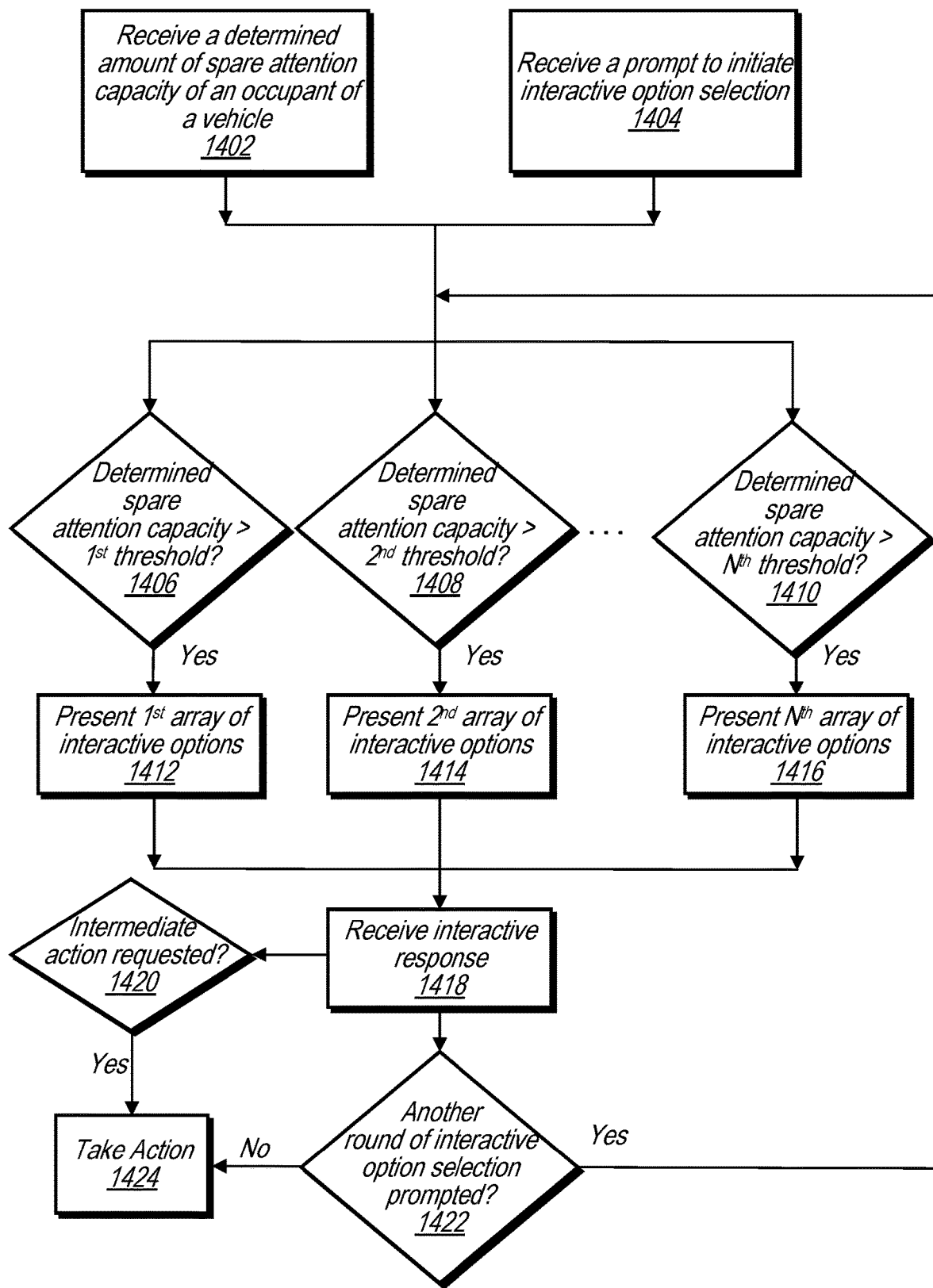
FIG. 14 illustrates a more detailed flowchart for using a determined estimated amount of spare attention capacity of an occupant of a vehicle to dynamically determine interactive options to be presented to the occupant of the vehicle, according to some embodiments.

FIG. 14 illustrates a more detailed flowchart for using a determined estimated amount of spare attention capacity of an occupant of a vehicle to dynamically determine interactive options to be presented to the occupant of the vehicle, according to some embodiments.

At 1402, a filtering application, such as filtering application 106, receives a determined estimated amount of spare attention capacity of an occupant of a vehicle from a dynamic attention capacity monitoring service, such as dynamic attention capacity monitoring service 112.

At 1404, the filtering application receives a prompt related to initiation of interactive option selection. For example, an incoming message could prompt an interactive option selection. Also, an action taken within a vehicle, such as interacting with a vehicle control system or a vehicle entertainment system could prompt an interactive option selection. For example, the occupant could initiate an action with a navigation system of the vehicle that prompts an interactive menu of options to be presented to the occupant of the vehicle. In some embodiments, different prompts may be assigned different priorities. In such embodiments, the filtering application may further take into account the priority of the prompt when dynamically determining interactive options to be presented to the occupant of the vehicle.

In some embodiments, different sets of interactive options may be presented to the occupant in response to the same given prompt depending upon the occupant's current estimated spare attention capacity to process and respond to presented interactive options. For example, at 1406, 1408, and 1410 the filtering application selects between different arrays or sets of interactive options to present to the occupant based on the current estimated spare attention capacity of the occupant. Also, at 1412, 1414, and 1416 the selected array of interactive options (selected based on spare attention capacity) is presented to the occupant.

At 1418, the filtering application receives an interactive response from the occupant, wherein the response is in response to the array of interactive options presented to the occupant. For example, the prompt may be "incoming call." The first array of interactive options may be "answer" or "ignore." The second array of interactive options may be "answer", "ignore", or "send automatically generated response text." The third array of interactive options may be "answer", "ignore", or "dictate customized response text." In the case of the third array. The occupant may select "dictate customized response text" as a response. This may cause an intermediate action of sending the incoming call to voice mail to be taken. For example at 1420, the response may indicate that an intermediate action, such as sending the incoming call to voicemail is to be taken, and the action may be taken at 1424. Also, the response may prompt another round of interactive option selection, such as at 1422. For example, text message dictation may provide another array of interactive options to the occupant to select from. In some embodiments, the subsequent interactive options to be presented to the occupant may further be dynamically determined based on the occupant's current estimated spare attention capacity.

As discussed above, at 1420, the filtering application determines if the interactive response invokes an intermediate action, and if so, at 1424 takes the intermediate action.

Also as discussed above, at 1422, the filtering application determines if the interactive response prompts another round of interactive option selection. If so, the process returns to 1406, 1408, and 1410 to select an array of interactive options to present to the occupant based on the estimated current spare attention capacity of the occupant of the vehicle.

At 1424, an action invoked by the interactive response is taken. For example, the action may be adjusting an entertainment feature of a vehicle, adjusting a control feature of a vehicle, entering information into a vehicle system, such as a navigation system. Also, the action may be sending a message, presenting an incoming message, or responding to an incoming message. In some embodiments, various other actions could be taken based on an interactive response received from an occupant of a vehicle.

Example Computer System

Figure 15:
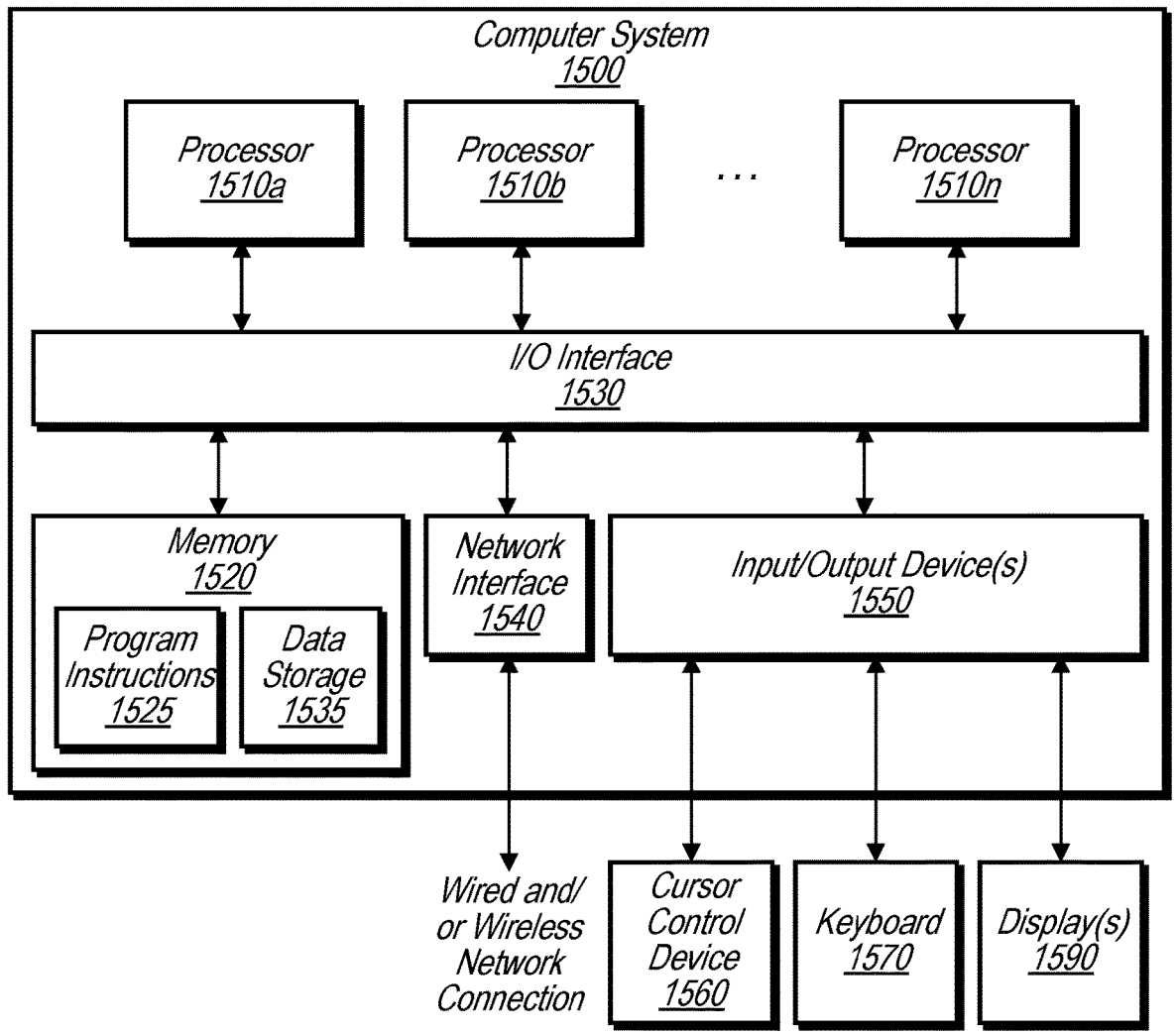
FIG. 15 is a block diagram illustrating an example computer system that implements some or all of the techniques described herein, according to some embodiments.

Any of various computer systems may be configured to implement processes associated with the provider network, dynamic attention capacity monitoring service, filtering application, or any other component of the above figures. For example, FIG. 15 is a block diagram illustrating an example computer system that implements some or all of the techniques described herein, according to some embodiments. In various embodiments, the provider network, dynamic attention capacity monitoring service, filtering application, or any other component of the above figures FIGS. 1-14 may each include one or more computer systems 1500 such as that illustrated in FIG. 15.

In the illustrated embodiment, computer system 1500 includes one or more processors 1510 coupled to a system memory 1520 via an input/output (I/O) interface 1530. Computer system 1500 further includes a network interface 1540 coupled to I/O interface 1530. In some embodiments, computer system 1500 may be illustrative of servers implementing enterprise logic or downloadable application, while in other embodiments servers may include more, fewer, or different elements than computer system 1500.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be embedded processors implementing any of a variety of instruction set architectures (ISAs), such as the x106, PowerPC, SPARC, or MIPS ISAs, or any other suitable ISA. In multiprocessor systems, each of processors 1510 may commonly, but not necessarily, implement the same ISA.

System memory 1520 may be configured to store instructions and data accessible by processor 1510. In various embodiments, system memory 1520 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 1520 as program instructions 1525. In some embodiments, system memory 1520 may include data 1535 which may be configured as described herein.

In one embodiment, I/O interface 1530 may be configured to coordinate I/O traffic between processor 1510, system memory 1520 and any peripheral devices in the system, including through network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments, some or all of the functionality of I/O interface 1530, such as an interface to system memory 1520, may be incorporated directly into processor 1510.

Network interface 1540 may be configured to allow data to be exchanged between computer system 1500 and other computer systems 1500 or devices attached to a network, such as the local network discussed above, a wide-area network, or a local network within the provider network, for example. In particular, network interface 1540 may be configured to allow communication between computer system 1500 and/or various I/O devices 1550. I/O devices 1550 may include scanning devices, display devices, input devices and/or other communication devices, as described herein. Network interface 1540 may commonly support one or more wireless networking protocols (e.g., Wi-Fi/IEEE 802.11, or another wireless networking standard). However, in various embodiments, network interface 1540 may support communication via any suitable wired or wireless general data networks, such as other types of Ethernet networks, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1500 via I/O interface 1530. A computer-readable storage medium may also include any volatile or non-volatile media such as RAM (e.g. SDRAM, DDR SDRAM, RDRAM, SRAM, etc.), ROM, etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

In some embodiments, I/O devices 1550 may be relatively simple or "thin" client devices. For example, I/O devices 1550 may be configured as dumb terminals with display, data entry and communications capabilities, but otherwise little computational functionality. However, in some embodiments, I/O devices 1550 may be computer systems configured similarly to computer system 1500, including one or more processors 1510 and various other devices (though in some embodiments, a computer system 1500 implementing an I/O device 1550 may have somewhat different devices, or different classes of devices).

In various embodiments, I/O devices 1550 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1550 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1500. In general, an I/O device 1550 (e.g., cursor control device 1560, keyboard 1570, or display(s) 1580 may be any device that can communicate with elements of computing system 1500.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system comprising one or more computing devices configured to:

implement a cloud-based dynamic attention capacity monitoring service configured to:

receive, via a network connection with a vehicle, information related to operation of the vehicle or conditions within which the vehicle is operating;

generate a spare attention capacity model for an occupant of the vehicle, wherein weighting-factors used by the model are learned, at least in part, from historical driving records of the occupant stored by a cloud service provider that provides the cloud-based dynamic attention capacity monitoring service;

determine, based on the received information and the spare attention capacity model for the occupant, an estimated amount of spare attention capacity of the occupant, wherein the estimated amount of spare attention capacity represents a difference between an overall estimated attention capacity of the occupant of the vehicle and an estimated amount of attention required of the occupant of the vehicle for operation of the vehicle given current conditions within which the vehicle is operating; and provide, via the network connection with the vehicle, the determined estimated amount of spare attention capacity to an application implemented in the vehicle, wherein the determined estimated amount of spare attention capacity is used by the application to dynamically determine interactive options to be presented to the occupant of the vehicle, wherein the application is configured to dynamically adjust the interactive options presented to the occupant of the vehicle based on a current estimated amount of spare attention capacity of the occupant of the vehicle to process or respond to the interactive options, wherein the interactive options comprise:
- a first type of interactive options for a first estimated amount of spare attention capacity,
- a second type of interactive options for a second estimated amount of spare attention capacity, and
- wherein the first set and the second type of interactive options require different levels of response effort from the occupant and provide the occupant with different levels of response customization.

2. The system of claim 1, wherein the one or more computing devices configured to implement the cloud-based dynamic attention capacity monitoring service are further configured to:

implement an interface configured to provide the application for download to a local device, local to the vehicle or the occupant, wherein the application, when executing on the local device is configured to:
- in response to a given prompt, cause the occupant to be presented with the first type of interactive options which comprise a first quantity of interactive options selected based on the first estimated amount of spare attention capacity of the occupant of the vehicle; and
- in response to the same given prompt, cause the occupant to be presented with the second type of interactive options which comprise a second quantity of interactive options selected based on the second estimated amount of spare attention capacity of the occupant of the vehicle.

3. The system of claim 2, wherein the second quantity of interactive options comprises more layers of interactive options than the first quantity of interactive options, and wherein the second estimated amount of spare attention capacity is a greater amount than the first estimated amount of spare attention capacity.

4. The system of claim 1, wherein the interactive options are presented to the occupant as:
- a list of audible options for the occupant to audibly select or respond to; or
- a list of visual options for the occupant to select or respond to via a visual user interface of the vehicle or a mobile device in the vehicle.

5. A method, comprising:
- receiving, at a cloud-based dynamic attention capacity monitoring service, information related to operation of a vehicle or conditions within which the vehicle is operating;
- generating a spare attention capacity model for an occupant of the vehicle, wherein weighting-factors used by the model are learned, at least in part, from historical driving records of the occupant stored by a cloud service provider that provides the cloud-based dynamic attention capacity monitoring service;
- determining, by the cloud-based dynamic attention capacity monitoring service, based on the received information and the spare attention capacity model, an amount of spare attention capacity of the occupant of the vehicle; and
- providing the determined amount of spare attention capacity of the occupant of the vehicle to an application implemented in a local computing device in the vehicle, wherein the application is configured to dynamically adjust the interactive options presented to the occupant of the vehicle based on a current determined amount of spare attention capacity of the occupant of the vehicle received from the cloud-based dynamic attention capacity monitoring service such that the interactive options presented to the occupant of the vehicle do not exceed the current determined amount of spare attention capacity of the occupant of the vehicle to process or respond to the interactive options, wherein the interactive options comprise:
- a first type of interactive options for a first estimated amount of spare attention capacity,
- a second type of interactive options for a second estimated amount of spare attention capacity, and
- wherein the first type and the second type of interactive options require different levels of response effort from the occupant and provide the occupant with different levels of response customization.

6. The method of claim 5, wherein the received information related to operation of the vehicle or conditions within which the vehicle is operating indicates one or more of:
- a current speed of the vehicle;
- information from a camera associated with the vehicle or the occupant;
- a level of complexity of a route along which the vehicle is travelling;
- current road or weather conditions;
- a level of alertness of the occupant determined based on interactions between the occupant and the vehicle;
- an amount of time the occupant has been in the vehicle;
- a current time of day; or
- whether an auto-pilot feature of the vehicle is enabled.

7. The method of claim 5, wherein the received information related to operation of the vehicle or conditions within which the vehicle is operating are received at the cloud-based dynamic attention capacity monitoring service from one or more of:
- an inertial measurement unit included in a portable device located in the vehicle;
- a navigation system of the vehicle;
- a weather reporting service; or
- a traffic reporting service.

8. The method of claim 5, wherein the cloud-based dynamic attention capacity monitoring service is configured to use a machine learning algorithm to generate the spare attention capacity model, and wherein generating the spare attention capacity model comprises:
- determining, via the machine learning algorithm, an overall attention capacity of the occupant of the vehicle based on historical interactions between the occupant and the vehicle; and
- determining, via the machine learning algorithm, respective required amounts of attention capacity of the occupant of the vehicle for a plurality of vehicle conditions based on historical interactions between the occupant and the vehicle.

9. The method of claim 5, further comprising
- dynamically determining, by the cloud-based dynamic attention capacity monitoring service, the first or the second type of interactive options to present to the occupant of the vehicle based on the determined amount of spare attention capacity of the occupant of the vehicle to process or respond to the interactive options; and
- causing a local device, local to the vehicle or the occupant of the vehicle, to present the dynamically determined first or second type of interactive options to the occupant of the vehicle such that the first or second type of interactive options do not exceed a current amount of spare attention capacity of the occupant of the vehicle to process or respond to the interactive options.

10. The method of claim 5, further comprising:
dynamically determining, by a local device, local to the vehicle and remote from the cloud-based dynamic attention capacity monitoring service, the first or the second type of interactive options to present to the occupant of the vehicle based on the determined amount of spare attention capacity of the occupant of the vehicle received from the cloud-based service; and
presenting the dynamically determined first or second type of interactive options to the occupant of the vehicle such that the interactive options do not exceed a current amount of spare attention capacity of the occupant of the vehicle to process or respond to the interactive options.

11. The method of claim 5, wherein for another vehicle said receiving the information and said determining the amount of spare attention capacity are performed by a local device, local to the other vehicle or the occupant of the other vehicle, wherein the cloud-based dynamic attention capacity monitoring service provides spare attention capacity weighting factors to the local device of the other vehicle for use in determining the amount of spare attention capacity, and wherein the application is implemented on the local device of the other vehicle.

12. One or more non-transitory, computer-readable, storage media storing instructions that, when executed on or across one or more processors, cause the one or more processors to:
implement an interface for a cloud-based dynamic attention capacity monitoring service, wherein the interface is configured to provide an application for download to a local device, local to a vehicle or local to an occupant of the vehicle, wherein the application, when executing on the local device is configured to:
receive, from the cloud-based dynamic attention capacity monitoring service, via a network connection between the cloud-based dynamic attention capacity monitoring service and the local device, an estimated amount of spare attention capacity of the occupant of the vehicle; and
dynamically determine interactive options to present to the occupant of the vehicle based on the estimated amount of spare attention capacity of the occupant of the vehicle to process or respond to the interactive options, wherein the interactive options are dynamically determined such that the interactive options presented to the occupant of the vehicle do not exceed a current amount of spare attention capacity of the occupant of the vehicle to process or respond to the interactive options,
wherein the interactive options comprise:
a first type of interactive options for a first estimated amount of spare attention capacity,
a second type of interactive options for a second estimated amount of spare attention capacity, and
wherein the first set and the second types of interactive options require different levels of response effort from the occupant and provide the occupant with different levels of response customization.

13. The one or more non-transitory computer-readable storage media of claim 12, wherein the instructions when executed on or across the one or more processors cause the one or more processors to:
in response to a given prompt, cause the occupant to be presented with the first type of interactive options which comprises a first quantity of interactive options selected based on the first estimated amount of spare attention capacity of the occupant of the vehicle; and
in response to the same given prompt, cause the occupant to be presented with the second type of interactive options which comprise a second quantity of interactive options selected based on the second estimated amount of spare attention capacity of the occupant of the vehicle.

14. The one or more non-transitory computer-readable storage media of claim 12, wherein the instructions when executed on or across the one or more processors cause the one or more processors to:
determine more interactive options to be presented to the occupant of the vehicle when the spare attention capacity of the occupant of the vehicle is high and fewer interactive options to be presented to the occupant of the vehicle when the spare attention capacity of the occupant of the vehicle is low.

15. The one or more non-transitory computer-readable storage media of claim 12, wherein the instructions when executed on or across the one or more processors cause the one or more processors to:
present the determined interactive options to the occupant of the vehicle as a list of audible options for the occupant to audibly select or respond to.

16. The one or more non-transitory computer-readable storage media of claim 15, wherein the list of audible options are determined for the second estimated amount of spare attention capacity, and
wherein the instructions when executed on or across the one or more processors cause the one or more processors to:
dynamically determine other interactive options to present to the occupant of the vehicle based on the first estimated amount of spare attention capacity of the occupant of the vehicle; and
present the other determined interactive options to the occupant of the vehicle as a list of visual options for the occupant to select or respond to via a visual user interface of the vehicle or a mobile device in the vehicle.

17. The one or more non-transitory computer-readable storage media of claim 16, wherein the determined interactive options or the other determined interactive options comprise options for responding to a message directed to the occupant of the vehicle.

18. The one or more non-transitory computer-readable storage media of claim 16, wherein the determined interactive options or the other determined interactive options comprise options for controlling one or more vehicle control features or vehicle entertainment features of the vehicle.

19. The one or more non-transitory computer-readable storage media of claim 12, wherein the instructions when executed on or across the one or more processors cause the one or more processors to:
receive information related to operation of a vehicle or conditions within which the vehicle is operating;
determine, based on the received information, the estimated amount of spare attention capacity of the occupant of the vehicle; and
provide the determined estimated amount of spare attention capacity of the occupant of the vehicle to the application downloaded to the local device, when the estimated amount of spare attention capacity is not available to be received from the cloud-based dynamic attention capacity monitoring service.

\* \* \* \* \*